(12) United States Patent
Khatib et al.

(10) Patent No.: US 10,153,697 B2
(45) Date of Patent: Dec. 11, 2018

(54) MULTIPHASE POWER SUPPLY AND FAILURE MODE PROTECTION

(71) Applicant: Infineon Technologies Austria AG, Villach OT (AT)

(72) Inventors: Mudassar Khatib, Warwick, RI (US); Danny Clavette, Greene, RI (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/483,317

(22) Filed: Apr. 10, 2017

(65) Prior Publication Data

US 2018/0294719 A1    Oct. 11, 2018

(51) Int. Cl.
| | | |
|---|---|---|
| *H02H 3/08* | (2006.01) | |
| *H02M 3/158* | (2006.01) | |
| *H02M 1/084* | (2006.01) | |
| *H02M 1/32* | (2007.01) | |
| *H02M 1/00* | (2006.01) | |

(52) U.S. Cl.
CPC ........... *H02M 3/158* (2013.01); *H02M 1/084* (2013.01); *H02M 1/32* (2013.01); *H02M 2001/0009* (2013.01); *H02M 2001/325* (2013.01)

(58) Field of Classification Search
CPC .......... H02M 3/156; H02M 1/08; H02H 3/20; H02H 3/207; H02J 1/10; H02J 7/003
USPC .... 323/222, 224, 267, 282–287; 361/56, 90, 361/91.1–91.6
See application file for complete search history.

(56) References Cited

U.S. PATENT DOCUMENTS

| | | | | |
|---|---|---|---|---|
| 7,411,802 B2* | 8/2008 | Victor | ..................... | H02M 7/48 363/132 |
| 8,358,112 B2* | 1/2013 | Schrom | ................... | H02M 1/14 323/272 |
| 8,582,259 B2* | 11/2013 | Murakami | ......... | H03K 17/0822 361/56 |
| 9,577,505 B1* | 2/2017 | Wu | ......................... | H02M 1/08 |
| 2004/0022684 A1* | 2/2004 | Heinze | ................... | B82Y 10/00 422/82.08 |

(Continued)

OTHER PUBLICATIONS

Panguloori, Rakesh, "What is an eFuse?", Dec. 2016, pp. 1-13, Texas Instrument, Application Report.

(Continued)

*Primary Examiner* — Rajnikant Patel
(74) *Attorney, Agent, or Firm* — Chapin IP Law, LLC

(57) ABSTRACT

A multi-phase power supply circuit includes multiple phases to convert an input voltage into a respective output voltage to power a load. A first phase of the multi-phase power supply includes a core power supply circuit including, for example, high side switch circuitry and low side switch circuitry. During normal operation, the core power supply circuit converts an input voltage into a respective output voltage to power a load. To provide failure mode protection with respect to the core power supply circuit and prevent a failure mode in which the first phase would otherwise produce a dangerous over-voltage condition, the first power supply phase includes an input voltage switch circuit disposed between an input voltage source and the core power supply circuit. The input voltage switch circuit provides a way of preventing the input voltage from being conveyed to the core power supply circuit during a failure mode.

36 Claims, 9 Drawing Sheets

(56) References Cited

U.S. PATENT DOCUMENTS

2012/0274293 A1* 11/2012 Ren .................... H02M 3/1584
  323/271
2013/0308061 A1* 11/2013 Murakami .......... H02M 3/1582
  348/730

OTHER PUBLICATIONS

Texas Instruments, www.ti.com/lit/ds/symlink/tps24711.pdf; Jan. 2011—revised Nov. 2015. pp. 1-38.

* cited by examiner

MULTIPHASE POWER SUPPLY AND FAILURE MODE PROTECTION

BACKGROUND

Conventional multi-phase power supplies may include one or more DC to DC converters to produce a respective output voltage to power a load. Any number of phases in a multi-phase power supply can be operated in parallel to produce the output voltage powering the load.

One type of DC to DC converter is a single-stage power converter system. As its name suggests, in the single-stage power converter system, each phase includes a single power converter to convert an input voltage such as 48 V DC (Volts Direct Current) into a respective target output voltage such as 1 volt DC to power a load.

Another type of DC to DC converter is a so-called two-stage power converter system. As its name suggests, the two-stage power converter system includes two power converter stages to produce a respective output voltage. As an example, a first power converter stage typically converts an input voltage such as 48 V DC into an intermediary voltage such as 12 V DC. A second power converter stage converts the intermediary voltage such as 12 V DC into a target output voltage such as 1 volt DC. Each stage could be a different power converter topology. For the second stage, typically a multi-phase buck converter topology is used. Accordingly, the system converts 48 VDC into 1 VDC.

In certain instances, a respective multi-phase power supply can be configured to monitor its own health. In response to detecting a condition in which a failure occurs, all of the phases in the power supply can be deactivated to prevent damage to the multi-phase power supply and/or the load driven by the output voltage.

BRIEF DESCRIPTION

This disclosure includes the observation that conventional techniques of controlling phases and preventing damage caused by failing multiphase power supplies suffer from deficiencies. For example, as previously discussed, a conventional single-stage power converter system (such as a buck converter topology) can be used to convert an input voltage such as 48 V DC into 1 volt DC to power a load. This conventional single stage power supply is prone to a failure condition in which respective high side switch circuitry in the phase is stuck (fails) to an ON state, potentially causing the input voltage of 48 V DC to become the output voltage instead of a down-converted output of 1 VDC. This failure condition of outputting 48 VDC instead of 1 VDC is undesirable because inadvertently outputting such a high output voltage (such as 48 VDC) during the failure condition will likely cause severe damage to any circuitry powered by the respective power converter system.

Also, as previously discussed, in certain instances, a conventional power converter can include two stages—a first stage to convert 48 volts DC into an intermediate voltage such as 12 V DC, and a second stage to convert the 12 V DC into 1 V DC. This two-stage converter may provide some amount of protection and fault isolation against an input voltage such as 48 V DC from being accidentally outputted to remote server powered devices. For example, during a failure, the second stage may fail and output 12 VDC to a load instead of 1 VDC. Inadvertently outputting 12 V DC (albeit much less than 48 V DC in the above failure case for a single stage converter) during a failure condition from an output port that should output only output 1 VDC may also cause serious damage to respective powered devices. Moreover, in addition to being prone to failure as discussed above, another disadvantage of this two-stage power converter circuit is that the power supply circuit is potentially twice the size of a single stage converter because it includes two converters.

Embodiments herein include novel ways of preventing a respective power supply from damaging a load due to a failure of a respective power supply phase.

More specifically, embodiments herein include a multi-phase power supply circuit that converts a received input voltage into a respective output voltage to power a load. A first power supply phase of the multi-phase power supply includes a core power supply circuit including, for example, high side switch circuitry and low side switch circuitry. During normal operation, the core power supply circuit (such as a combination of the high side switch circuitry and the low side switch circuitry of a buck converter) receives and converts an input voltage into a respective output voltage to power a load. To provide failure mode protection with respect to the core power supply circuit and prevent a failure mode of producing a dangerous over-voltage condition, the first power supply phase includes an input voltage switch circuit disposed between an input voltage source and the high side switch circuitry in the first phase. During operation, the input voltage switch circuit provides a way of selectively isolating the input voltage received from the voltage source from the high side switch circuitry.

For example, in one embodiment, when a failure mode is detected with respect to a phase, the input voltage switch circuit (isolation circuitry) of a respective phase is set to an OFF state in order to prevent the input voltage from being conveyed to the core power supply circuit in that phase. In such an instance, the respective failing power supply phase is prevented from outputting dangerously high voltages to a respective load. Conversely, when no failure is detected, the input voltage switch circuit in the respective phase is set to an ON state to convey the input voltage to the respective core power supply circuit. In this latter instance, the first power supply phase converts the received input voltage into an appropriate output voltage to power a respective load. Again, as mentioned, detection of a respective failure results in turning the input voltage switch circuit to an OFF state in order to prevent the input voltage from being conveyed to the core power supply that phase.

In one embodiment, each phase in the multi-phase power supply includes a monitor circuit operable to monitor a health status of the respective phase in which the monitor circuit resides. Additionally or alternatively, the monitor circuit can monitor a health of any of one or more other phases in the multi-phase power supply. Each phase additionally includes a control circuit. In response to detecting a failure as indicated by the monitored health status of the phase, the control circuit in the phase deactivates the input voltage switch circuit to an OFF state. Accordingly, upon detecting a failure in a given phase, embodiments herein include deactivating the input voltage switch circuit in the respective phase to prevent the input voltage from being conveyed to the core power supply circuit producing the output voltage for the respective phase.

In accordance with further embodiments, note that the monitor circuit in a particular phase can be configured to monitor any suitable parameter. For example, in one embodiment, the monitor circuit monitors a magnitude of current conveyed through the input voltage switch circuit (such as current from the voltage source through the activated input voltage switch circuit) to corresponding high side switch circuitry in a core power converter of the phase. In response to the failure condition that a magnitude of the current through the switch is above a threshold value, a control circuit in the phase (experiencing the over-current condition) deactivates the input voltage switch circuit to an OFF state. The OFF state of the input voltage switch circuit electrically isolates the high side switch circuitry of that phase from receiving the input voltage. Accordingly, in such an instance, the core power supply circuitry (such as a buck converter including high side switch circuitry and low side switch circuitry) of the phase experiencing the failure is not able to generate or contribute to producing an output voltage to power load. In other words, the phase is disabled from producing a respective output voltage because the core power supply of that phase does not receive the input voltage.

In accordance with yet further embodiments, note that a failure condition can be latched using a respective latch circuit such that the failing phase is prevented from being activated again until the respective latch circuit is reset.

In accordance with still further embodiments, the input voltage switch circuit can be disposed between an input voltage source (supplying input voltage) and the high side switch circuitry. Assume that a circuit path connects the input voltage switch circuit to the high side switch circuitry. In such an instance, the input voltage switch circuit can be configured to selectively convey the input voltage from the input voltage source through the input voltage switch circuit to the circuit path connecting the input voltage switch circuit to the high side switch circuitry. In this manner, the input voltage switch circuit selectively conveys an input voltage to the respective high side switch circuitry.

In one embodiment, in order to produce a sufficiently high-voltage to control the high side switch circuitry (such as one or more field effect transistors), the first phase (and potentially each of one or more phases in the multi-phase power supply) can include a voltage generator circuit whose power input is referenced with respect to a voltage level of the above-mentioned circuit path (such as a circuit path connecting the input voltage switch circuit to the high side switch circuitry) to produce an internal supply voltage with respect to the voltage level of the circuit path. A respective phase can include an input voltage control circuit that receives and uses the internal supply voltage generated by the voltage generator circuit to control the input voltage switch circuit to an ON state.

In accordance with further embodiments, a respective phase can be configured to include multiple so-called bootstrap voltages. For example, in one embodiment the respective phase can include a first bootstrap voltage generator circuit operable to produce a first bootstrap voltage; a first switch control circuit uses the first bootstrap voltage used to control the input voltage switch circuit. In further embodiments, a power input of the first bootstrap voltage generator circuit is referenced to a voltage level of a first circuit path coupling the input voltage switch circuit to the high side switch circuitry in the respective phase. The respective phase can further include a second bootstrap voltage generator circuit operable to produce a second bootstrap voltage; the second switch control circuit uses the second bootstrap voltage to control the high side switch circuitry. In further embodiments, a power input of the second bootstrap voltage generator circuit is referenced to a voltage level of a second circuit path coupling the high side switch circuitry to the low side switch circuitry.

As previously discussed, a multi-phase power supply can include multiple phases including a first power supply phase, a second power supply phase, etc. The first power supply phase can be configured to include a first input voltage switch circuit disposed between the voltage source and a core power supply circuit (such as including high side switch circuitry and low side switch circuitry) in the first power supply phase. The first input voltage switch circuit controls conveyance of the input voltage received from the voltage source to the core power supply of the first power supply phase. Similar to the first phase, the second power supply phase can be configured to include a respective input voltage switch circuit disposed between the voltage source and a core power supply circuit (such as including high side switch circuitry and low side switch circuitry) in the second power supply phase. The second input voltage switch circuit controls conveyance of the input voltage received from the voltage source to the power supply of the second power supply phase.

In accordance with further embodiments, each phase includes control circuitry to independently deactivate the first input voltage switch circuit (of the first phase) and the second input voltage switch circuit (of the second phase). For example, the first phase can include a first control switch; the second phase can include a second control switch. The first control switch deactivates the first input voltage switch circuit of the first phase in response to detecting a failure condition associated with the first phase. Assuming that the second phase does not detect a failure condition associated with the second phase, the second control switch continues activating the second input voltage switch circuit to an ON state (even though the first phase is deactivated) so that the input voltage is conveyed to the power converter circuit in the second phase. In such an instance, any of one or more non-failing phases including the second phase continue to produce a respective output voltage to power load without interruption. Conversely, because the first phase experiences a failure, deactivation of the input voltage switch circuit in the first phase prevents the input voltage from being conveyed to the core power supply circuit in the first phase. Accordingly, in such an instance, the first phase does not produce an output voltage to power the load because the input voltage is isolated from the corresponding core power converter in the first phase.

Such embodiments ensure that one or more failing phases do not cause shutdown of the multi-phase power supply. Instead, as mentioned, any non-failing phases continue to produce a respective output voltage to power a respective load while the one or more failing phases are deactivated.

Note that the circuitry as discussed herein can be partitioned in any suitable manner. For example, in one embodiment, each phase includes control circuitry to control states of respective high side switch circuitry, low side switch circuitry, and the input voltage switch circuit. Drive circuitry receives control input from control circuitry to drive the high side switch circuitry, low side switch circuitry, and the input voltage switch circuit. In one embodiment, all circuitry including the control circuitry, drive circuitry, high side switch circuitry, low side switch circuitry, and the input voltage switch circuit are implemented in a multi-chip module as multiple chips.

In accordance with still further embodiments, high side switch circuitry, low side switch circuitry, and the input voltage switch circuitry of a respective phase can be implemented on a single integrated circuit chip.

In accordance with yet further embodiments, each of the high side switch circuitry, low side switch circuitry, and the input voltage switch circuitry can be implemented on a different integrated circuit chip. For example, the high side switch circuitry can be disposed on a first integrated circuit (chip); the low side switch circuitry can be disposed on a second integrated circuit (chip); the input voltage switch circuit can be disposed on a third integrated circuit (chip); etc.

In yet another embodiment, the input voltage switch circuit and corresponding driver/control circuitry (protection circuitry) are disposed on a single integrated circuit (chip).

Accordingly, the different components as discussed herein can be packaged in many different ways. These and other more specific embodiments are disclosed in more detail below.

Note that although embodiments as discussed herein are applicable to multi-phase power supply circuits such as those implementing buck converters, DC-DC converter phases, the concepts disclosed herein may be advantageously applied to any other suitable topologies as well as general power supply control applications.

Note further that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, ...) including computer program logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices), cause the computer processor hardware to: control a core power supply (such as a buck converter including a combination of high side switch circuitry and low side switch circuitry) in a first phase of the multi-phase power supply to produce a respective output voltage to power a load; control an input voltage switch circuit of the first phase, the input voltage switch circuit disposed in a circuit path between a voltage source and the core power supply in the first phase, the input voltage switch circuit controlled to convey an input voltage received from the voltage source to the core power supply; monitor the first phase for a failure (such as a failure condition in which a magnitude of current conveyed through the input voltage switch circuit from the voltage source to the core power supply of the first phase is above a threshold value); and deactivate the input voltage switch circuit in the first phase to an OFF state in response to detecting that the failure, the OFF state of the input voltage switch circuit electrically isolating the core power supply from receiving the input voltage.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with embodiments herein, a multi-phase power supply circuit includes multiple phases to convert an input voltage into a respective output voltage to power a load. A first phase of the multi-phase power supply includes a core power supply circuit such as or including a buck converter. During normal operation, the core power supply circuit converts an input voltage into a respective output voltage to power a load. To provide failure mode protection with respect to the core power supply circuit and prevent a failure mode in which the first phase would otherwise produce and output a dangerous over-voltage, the first power supply phase includes an input voltage switch circuit disposed between an input voltage source and the core power supply circuit. The input voltage switch circuit provides a way of isolating the input voltage received from the voltage source from being delivered to the core power supply circuit during a failure mode. As a specific example, in response to detecting a failure condition associated with a phase, embodiments herein include deactivating the input voltage switch circuit so that the core power supply is prevented from receiving the input voltage from the voltage source. A failing phase is thus prevented from producing an output voltage that will potentially damage a respective load.

Figure 1:
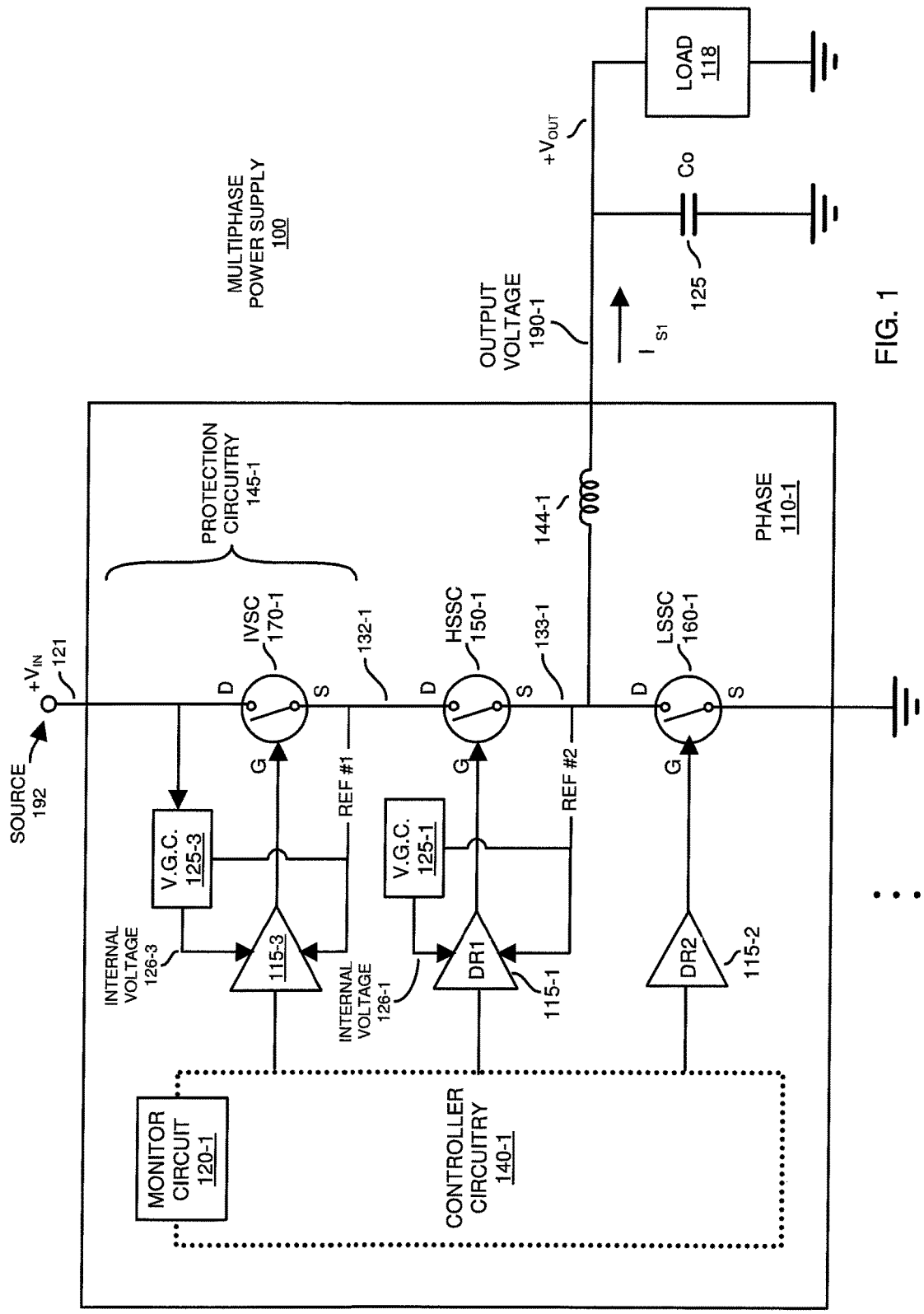
FIG. 1 is an example diagram illustrating a first power supply phase according to embodiments herein.

Now, more specifically, FIG. 1 is an example diagram of a power converter phase and respective circuitry according to embodiments herein.

As shown, power supply phase 110-1 is a first phase in a multi-phase power supply 100. The phase 110-1 includes control circuitry 140-1, monitor circuitry 120-1, driver circuitry 115-1, driver circuitry 115-2, driver circuitry 115-3, voltage generator circuit 125-1, voltage generator circuit 125-3, high side switch circuitry 150-1, low side switch circuitry 160-1, input voltage switch circuitry 170-1, and inductor 144-1.

In one embodiment, each of the high side switch circuitry 150-1, low side switch circuitry 160-1, and input voltage switch circuitry 170-1, are power MOSFET (Metal Oxide Semiconductor Field Effect Transistor) devices. If desired, each of these three circuits can be similar or same in design in which the devices have the same attributes.

During normal operation, when there are no failures, phase 110-1 produces output voltage 190-1 that powers load 118.

In this non-limiting example embodiment, the power supply phase 110-1 includes a core power supply circuit including, for example, high side switch circuitry 150-1 and low side switch circuitry 160-1. Note that the core power supply circuit in phase #1 can include any type of power supply operable to convert the input voltage 121 (such as 48 VDC) into a respective output voltage 190-1 (such as 1 VDC) to power load 118. Use of a buck converter is shown by way of non-limiting example embodiment.

As discussed herein, and as shown, the multiphase power supply 100 further includes protection circuitry 145-1 (such as including input voltage switch circuit 170-1, voltage generator circuit 125-3, driver circuitry 115-3, etc.) to control conveyance of the input voltage 121 to the high side switch circuitry 150-1 depending on a health of the respective phase 110-1.

During normal operation, to produce the output voltage 190-1, driver circuitry 115-3 activates the input voltage switch circuitry 170-1 to convey the input voltage 121 to the drain node of the high side switch circuitry 150-1. Assuming there are no failures associated with phase 110-1 as detected by the monitor circuit 120-1, as in a conventional buck converter, the control circuitry 140-1 control states of the driver circuitry 115-1 and the driver circuitry 115-2 to control the respective high side switch circuitry 150-1 and low side switch circuitry 160-1. Appropriate switching of the high side switch circuitry 150-1 and the low side switch circuitry 160-2 results in generation of the output voltage 190-1 as is known in a conventional power supply of this type.

To provide failure mode protection with respect to the core power supply circuit associated with phase 110-1 and prevent a failure mode of producing a dangerous over-voltage condition with respect to the output voltage 190-1, the first power supply phase as shown in FIG. 1 includes an input voltage switch circuit 170-1 disposed between an input voltage source 192 and the high side switch circuitry 150-1.

As previously discussed, during operation, the input voltage switch circuit 170-1 provides a way of selectively isolating the input voltage 121 received from the voltage source 192 from the high side switch circuitry 150-1.

As shown, the phase 110-1 includes monitor circuitry 120-1 to monitor a proper operation associated with the phase 110-1. Note that the monitor circuit 120-1 of phase 110-1 can be configured to monitor any suitable parameter associated with the phase 110-1 in order to make a determination of whether to deactivate the input voltage switch circuit 170-1.

In one embodiment, the monitor circuitry 120-1 is configured to monitor a magnitude of current conveyed through the input voltage switch circuit 170-1 (such as current from the voltage source 192 through the activated input voltage switch circuit 170-1) to corresponding high side switch circuitry 150-1. In response to detecting a failure condition indicating that a magnitude of the current delivered through the input voltage switch circuit 170-1 is above a threshold value, the controller circuitry 140-1 in the phase (detecting the over-current condition) deactivates the input voltage switch circuit 170-1 to an OFF state. The OFF state of the input voltage switch circuit 170-1 electrically isolates the high side switch circuitry 150-1 of the phase 110-1 from receiving the input voltage 121. Accordingly, in such an instance, the high side switch circuitry 150-1 of the deactivated phase 110-1 experiencing the failure is not able to generate or contribute to producing an output voltage to power load 118. In other words, when the input voltage switch circuit 170-1 is set to an OFF state, the phase 110-1 is disabled because the drain node (D) in the high side switch circuitry 150-1 does not receive the input voltage 121.

In addition to or as an alternative to monitoring the current through the input voltage switch circuit 170-1, the monitor circuitry 120-1 can be configured to monitor one or more parameters such as a temperature of circuitry associated with phase 110-1, magnitude of the output voltage 190-1, etc. In one embodiment, to determine occurrence of a respective failure, the monitor circuitry 120-1 (or controller circuitry 140-1) compares the one or more monitor parameters to respective thresholds.

In response to detecting a failure condition (such as that the temperature of the phase 110-1 is too high, the magnitude of the output voltage 190-1 of the phase 110-1 is too high or too low, etc.) as indicated by the monitor circuit 120-1, the controller circuitry 140-1 controls the driver circuitry 115-3 to set the input voltage switch circuit to an OFF state in order to prevent the input voltage 121 from being conveyed to the core power supply circuit in phase 110-1. In such an instance, the respective failing power supply phase (such as phase 110-1 and corresponding high side switch circuitry 115-1 in this example) is prevented from outputting dangerously high voltages to a respective load 118 because the high side switch circuitry 150-1 is isolated from receiving the input voltage 121 from the voltage source 192.

Conversely, note that when no failure is detected with respect to the power supply phase 110-1 (or when a failure no longer exists), the driver circuitry 115-3 controls the input voltage switch circuit 170-1 to an ON state to convey the input voltage 121 to the respective high side switch circuitry 150-1. In this latter instance, as previously discussed, the first power supply phase 110-1 is operable to convert the received input voltage 121 from input voltage switch circuit 170-1 into an appropriate output voltage 190-1 to power the load 118.

Note that switch circuitry (such as input voltage switch circuitry 170-1, high side switch circuitry 150-1, and low side switch circuitry 160-1) can be any suitable type of switch resource (field effect transistors, bipolar junction transistors, etc.).

In accordance with further embodiments, the high side switch circuitry 150-1 and low side switch circuitry 160-1 can include one or more field effect transistors. Additionally, the input voltage switch circuit 170-1 can include one or more field effect transistors. In such an instance, to activate field effect transistors, the respective driver circuitry 115-3 must be able to output a sufficiently high-voltage such that the driver circuitry 115-3 produces a gate-to-source voltage that turns ON a respective switch. Conversely, the drive circuitry 115-3 also has to be able to produce a sufficiently low voltage such that the driver circuitry produces a gate-to-source voltage that turns OFF a respective switch.

In one embodiment, in order to produce a sufficiently high-voltage to control the high side switch circuitry 170-1 (such as one or more field effect transistors), as shown, phase 110-1 can include a voltage generator circuit 125-3 whose power input (such as ground reference or voltage reference) is referenced with respect to a voltage level (voltage reference #1) of circuit path 132-1 connecting the source node of input voltage switch circuit 170-1 to the drain node of the high side switch circuitry 150-1.

During operation, the voltage generator circuit 125-3 produces internal supply voltage 125-3 with respect to the voltage level (REF #1 or voltage reference #1) of the circuit path 132-1. The driver circuitry 115-3 receives and uses the internal supply voltage 125-3 (such as a DC voltage several volts greater in magnitude than or offset with respect to the voltage reference REF #1) generated by the voltage generator circuit 125-3 to control the input voltage switch circuit 170-1 to an ON state.

In other words, when the control circuitry 140-1 indicates to activate the input voltage switch circuit 170-1 to an ON state, the drive circuitry 115-3 outputs the internal voltage 126-3 (which may be called a bootstrap voltage) to the gate node of input voltage switch circuit 170-1. This causes the input voltage switch circuit 170-1 to be activated to the ON state. Conversely, in one embodiment, in response to receiving input from the control circuitry 140-1 to deactivate the input voltage switch circuit 170-1 to an OFF state, the drive circuitry 115-3 drives the gate node of the input voltage switch circuit 170-1 with voltage reference #1 (REF #1). Thus, the output of the driver circuitry 115-3 toggles between outputting internal voltage 126-3 (such as high-voltage) and the reference voltage #1 (such as a low voltage) depending on whether the input voltage switch circuit 170-1 is to be activated.

In a similar manner, note that the voltage generator circuit 125-1 is referenced with respect to a voltage level (voltage reference #2 or REF #2) of the conductive path 133-1 connecting the source node of the high side switch circuitry 150-1 to the drain node of the low side switch circuitry 160-1. The voltage generator circuit 125-1 produces internal voltage 126-1 (such as a bootstrap voltage), which is inputted into the driver circuitry 115-1. When the control circuitry 140-1 indicates to activate the high side switch circuitry 150-1 to an ON state, the driver circuitry 115-1 outputs the internal voltage 126-1 (bootstrap voltage) to the gate node of the high side switch circuitry 150-1. This causes the high side switch circuitry 150-1 to be activated to the ON state.

Conversely, in response to receiving input from the control circuitry 140-1 to deactivate the high side switch circuitry 150-1 to an OFF state, the drive circuitry 115-1 drives the gate node of the high side switch circuitry 150-1 with voltage reference #2 (REF #2). Thus, the output of the driver circuitry 115-1 toggles between outputting internal voltage 126-1 (such as high-voltage) and the reference voltage #2 (such as a low voltage).

In one embodiment, a power supply can include a single phase such as phase 110-1 (unaccompanied by any other phases) to supply power to load 118.

Figure 2:
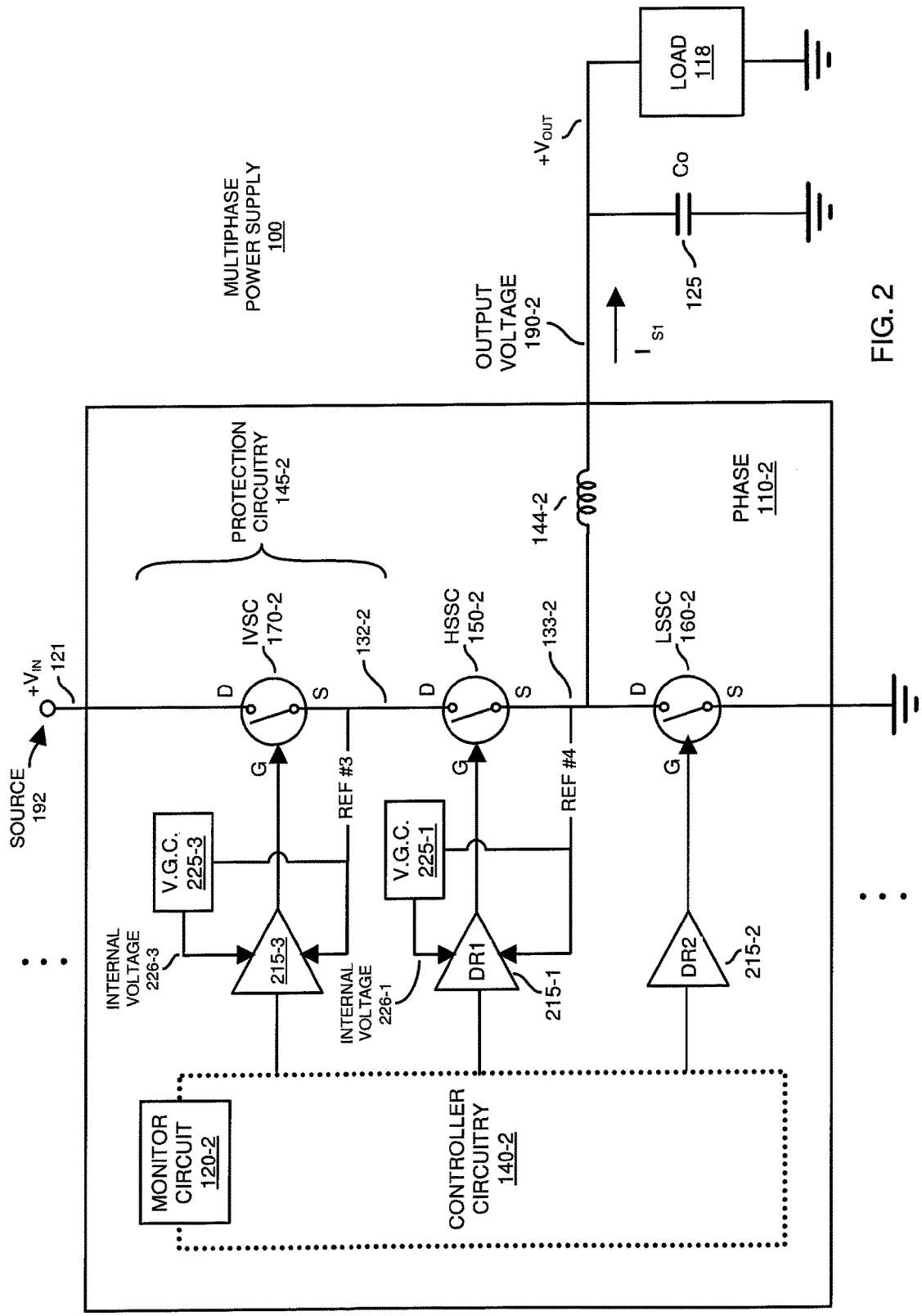
FIG. 2 is an example diagram illustrating a second power supply phase according to embodiments herein.

FIG. 2 is an example diagram illustrating a second power supply phase according to embodiments herein.

As shown, power supply phase 110-2 is a second phase in a multi-phase power supply 100. The phase 110-2 includes control circuitry 140-2, monitor circuitry 120-2, driver circuitry 215-1, driver circuitry 215-2, driver circuitry 215-3, voltage generator circuit 225-1, voltage generator circuit 225-3, high side switch circuitry 150-2, low side switch circuitry 160-2, input voltage switch circuitry 170-2, and inductor 144-2. Phase 110-2 produces output voltage 190-2 that powers load 118.

In this non-limiting example embodiment, the power supply phase 110-2 includes a core power supply circuit including high side switch circuitry 150-2 and low side switch circuitry 160-2. Note that the core power supply circuit in phase #2 can include any type of power supply operable to convert the input voltage 121 (such as 48 VDC) into a respective output voltage 190-2 (such as 1 VDC) to power load 118. Use of a buck converter is shown by way of non-limiting example embodiment.

As discussed herein, the power supply phase 110-2 further includes protection circuitry 145-2 (such as input voltage switch circuit 170-2, voltage generator circuit 225-3, driver circuitry 215-3, etc.) to control conveyance of the input voltage 121 to the high side switch circuitry 150-2 depending on a health of the respective phase 110-2.

During normal operation, to produce the output voltage 190-2, driver circuitry 215-3 activates the input voltage switch circuitry 170-2 to convey the input voltage 121 to the drain node of the high side switch circuitry 150-2. Assuming there are no failures associated with phase 110-2 as detected by the monitor circuit 120-2, as in a conventional buck converter, the control circuitry 140-2 controls states of the driver circuitry 215-1 and the driver circuitry 215-2 to control the respective high side switch circuitry 150-2 and low side switch circuitry 160-2. Appropriate switching of the high side switch circuitry 150-2 and the low side switch circuitry 160-2 results in generation of the output voltage 190-2.

To provide failure mode protection with respect to the core power supply circuit associated with phase 110-2 and prevent a failure mode of producing a dangerous over-voltage condition with respect to the output voltage 190-2, the second power supply phase as shown in FIG. 2 includes an input voltage switch circuit 170-2 disposed between an input voltage source 192 and the high side switch circuitry 150-2. During operation, the input voltage switch circuit 170-2 provides a way of isolating the input voltage 121 from being conveyed to the high side switch circuitry 150-2.

As shown, the phase 110-2 includes monitor circuitry 120-2 to monitor a proper operation associated with the phase 110-2. Note that the monitor circuitry 120-2 of phase 110-2 can be configured to monitor any suitable parameter associated with the phase 110-2 in order to make a determination of whether to deactivate the input voltage switch circuit 170-2.

In one embodiment, the monitor circuitry 120-2 is configured to monitor a magnitude of current conveyed through the input voltage switch circuit 170-2 (such as current from the voltage source 192 through the activated input voltage switch circuit 170-2) to corresponding high side switch circuitry 150-2. In response to detecting a failure condition indicating that a magnitude of the current delivered through the input voltage switch circuit 170-2 is above a threshold value, the controller circuitry 140-2 in the phase (detecting the over-current condition) deactivates the input voltage switch circuit 170-2 to an OFF state. The OFF state of the input voltage switch circuit 170-2 electrically isolates the high side switch circuitry 170-2 of the phase 110-2 from receiving the input voltage 121. Accordingly, in such an instance, the high side switch circuitry 150-2 of the deactivated phase 110-2 experiencing the failure is not able to generate or contribute to producing an output voltage to power load 118. In other words, the phase 110-2 is disabled because the high side switch circuitry 150-2 does not receive the input voltage 121 when the input voltage switch circuit 170-2 is turned OFF.

In addition to or as an alternative to monitoring the current through the input voltage switch circuit 170-2, the monitor circuitry 120-2 can be configured to monitor one or more parameters such as a temperature one or more circuit components, magnitude of output voltage 190-2, etc., associated with the phase 110-2. The monitor circuitry 120-2 (or controller circuitry 140-2) compares the one or more monitor parameters to respective thresholds.

In response to detecting a failure mode (such as that the temperature of the phase 110-2 is too high, the magnitude of the output voltage 190-2 of the phase 110-2 is too high or too low, etc.) as indicated by the monitor circuit 120-2, the controller circuitry 140-2 controls the driver circuitry 215-3 to set the input voltage switch circuit to an OFF state in order to prevent the input voltage 121 from being conveyed to the core power supply circuit in phase 110-2. In such an instance, the respective failing power supply phase (such as phase 110-2 and corresponding high side switch circuitry 150-2 in this example) is prevented from outputting dangerously high voltages to a respective load 118.

Conversely, note that when no failure is detected with respect to the power supply phase 110-2 (or when a failure no longer exists), the driver circuitry 215-3 controls the input voltage switch circuit 170-2 to an ON state to convey the input voltage 121 through the input voltage switch circuit 170-2 to the respective high side switch circuitry 150-2. In this latter instance, as previously discussed, the first power supply phase 110-2 is operable to convert the received input voltage 121 from input voltage switch circuit 170-2 into an appropriate output voltage 190-2 to power load 118.

Note that switch circuitry (input voltage switch circuitry 170-2, high side switch circuitry 150-2, and low side switch circuitry 160-2) can be any suitable type of switch resource (field effect transistors, bipolar junction transistors, etc.).

In accordance with one embodiment, the high side switch circuitry 150-2 and low side switch circuitry 160-2 can include one or more field effect transistors. Additionally, the input voltage switch circuit 170-2 can include one or more field effect transistors. In such an instance, to activate field effect transistors, the respective driver circuitry 215-3 must be able to output a sufficiently high-voltage such that the driver circuitry 215-3 produces a gate-to-source voltage that turns on a respective switch. Conversely, the drive circuitry 215-3 also has to be able to produce a sufficiently low voltage such that the driver circuitry produces a gate-to-source voltage that turns OFF a respective switch.

In one embodiment, in order to produce a sufficiently high-voltage to control the input voltage switch circuitry 170-2 (such as one or more field effect transistors), as shown, phase 110-2 can include a voltage generator circuit 225-3 whose power input (such as ground reference or voltage reference) is referenced with respect to a voltage level (voltage reference #3) of a circuit path 132-2 connecting the source node of input voltage switch circuit 170-2 to the drain node of the high side switch circuitry 150-2.

During operation, the voltage generator circuit 225-3 produces internal supply voltage 226-3 with respect to the voltage level (voltage reference #3) of the circuit path 132-2. The driver circuitry 215-3 receives and uses the internal supply voltage 226-3 (such as a DC voltage several volts greater in magnitude than or offset with respect to the voltage reference #3 or REF #3) generated by the voltage generator circuit 225-3 to control the input voltage switch circuit 170-2 to an ON state.

In other words, when the control circuitry 140-2 indicates to activate the input voltage switch circuit 170-2 to an ON state, the drive circuitry 215-3 outputs a magnitude of the internal voltage 226-3 to the gate node of input voltage switch circuit 170-2. This causes the input voltage switch circuit 170-2 to be activated to the ON state (low resistance such as less than one ohm between the drain and source node of the input voltage switch circuit 170-2). Conversely, in one embodiment, in response to receiving input from the control circuitry 140-2 to deactivate the input voltage switch circuit 170-2 to an OFF state (high resistance such as greater than 1,000,000 ohms), the drive circuitry 215-3 drives the gate node of the input voltage switch circuit 170-2 with voltage reference #3. Thus, the output of the driver circuitry 215-3 toggles between outputting internal voltage 226-3 (such as high-voltage) and the reference voltage #3 (such as a low voltage) is needed to convey the input voltage 121 to the drain node of the high side switch circuitry 150-2.

In a similar manner as previously discussed with respect to phase 110-1, note that the voltage generator circuit 225-1 of phase 110-2 is referenced with respect to a voltage level (voltage reference #4) of the conductive path 133-2 connecting the source node of the high side switch circuitry 150-2 to the drain node of the low side switch circuitry 160-2. The voltage generator circuit 225-1 produces internal voltage 226-1, which is inputted into the driver circuitry 215-1. When the control circuitry 140-2 indicates to activate the high side switch circuitry 150-2 to an ON state, the driver circuitry 215-1 outputs the internal voltage 226-1 to the gate node of the high side switch circuitry 150-2. This causes the high side switch circuitry 150-2 to be activated to the ON state. Conversely, in response to receiving input from the control circuitry 140-2 to deactivate the high side switch circuitry 150-2 to an OFF state, the drive circuitry 215-1 drives the gate node of the high side switch circuitry 150-2 with voltage reference #4 (REF #4). Thus, the output of the driver circuitry 215-1 toggles between outputting internal voltage 226-1 (such as a high voltage) and the reference voltage #4 (such as a low voltage).

Figure 3:
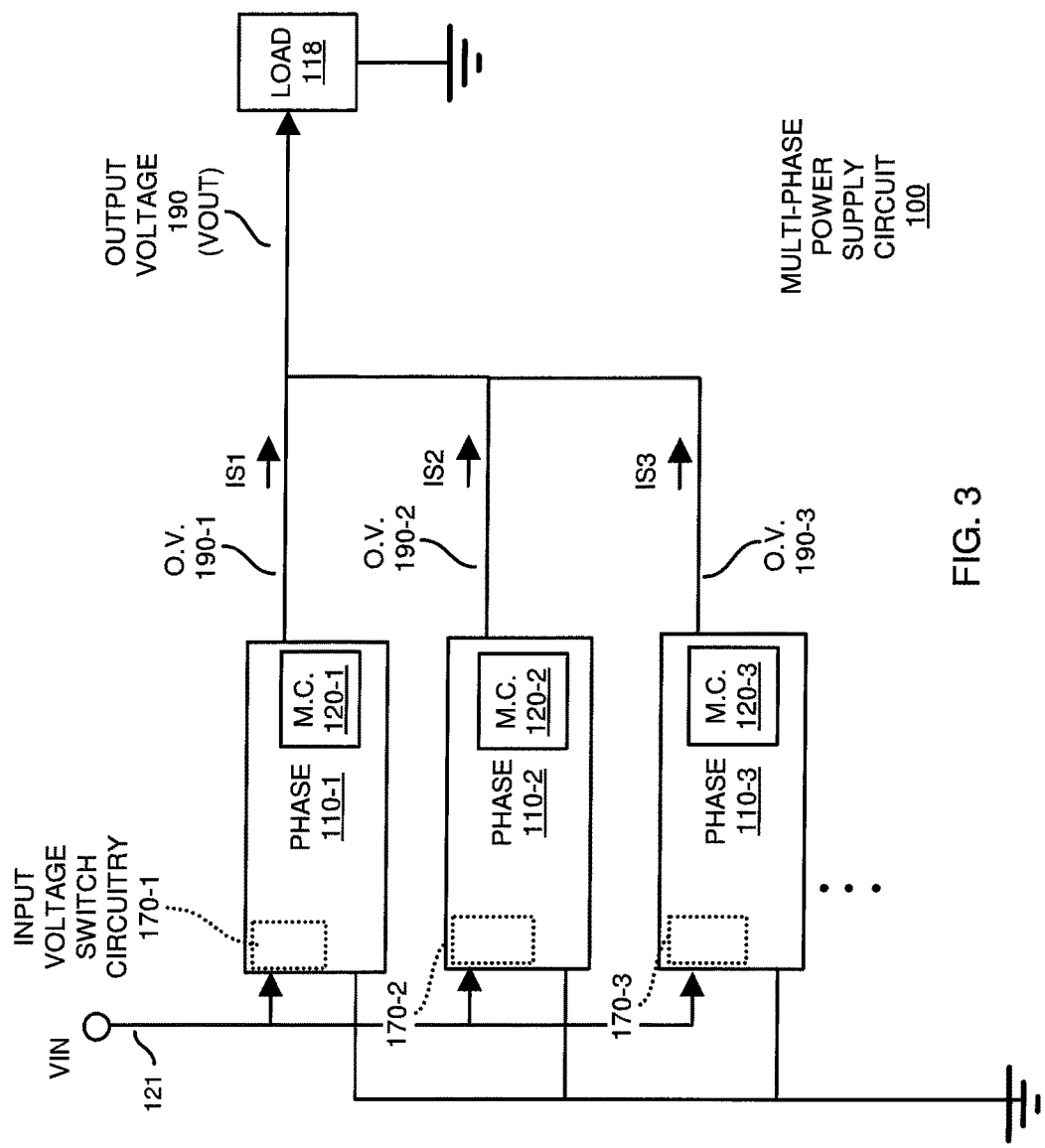
FIG. 3 is an example general diagram of a multi-phase power supply including multiple phases according to embodiments herein.

FIG. 3 is an example general diagram of a multi-phase power supply including multiple phases according to embodiments herein.

Shown, the multiphase power supply circuit 100 includes phase 110-1, phase 110-2, etc. Specific details of each of these phases were previously discussed with respect to FIG. 1 and FIG. 2.

As previously discussed, the phase 110-1 includes a monitor circuit 120-1 operable to monitor a health status of the respective phase 110-1 in which the monitor circuit 120-1 resides.

Assume that phase 110-1 experiences a failure condition as detected by monitor circuit 120-1. In one embodiment, in response to detecting the failure as indicated by the monitored health status of the phase 110-1, a respective control circuit in failing phase 110-1 deactivates a respective input voltage switch circuit 170-1 of phase 110-1 to an OFF state. Accordingly, upon detecting a failure in phase #1, embodiments herein include deactivating the input voltage switch circuit 170-1 in the respective phase to prevent the input voltage 121 from being conveyed to the core power supply (such as high side switch circuitry 150-1) in phase 110-1, preventing the phase 110-1 from producing a respective output voltage 190-1 to power the load 118.

In accordance with further embodiments, note that each phase can be independently deactivated depending on whether a failure is detected in the respective phase. For example, as previously discussed, in response to detecting the failure condition associated with phase 110-1, the input voltage switch circuit 170-1 is deactivated to an OFF state to prevent the phase 110-1 from producing an output voltage 190-1 to power load 118. Assuming that the monitor circuit 120-2 in the second phase 110-2 does not detect a failure condition associated with the second phase 120-2, the input voltage switch circuit 170-2 is continue to be driven to an ON state, enabling the phase 110-2 to continue producing the output voltage 190-2 to power load 118. Assuming that the monitor circuit 120-3 in the third phase 110-3 does not detect a failure condition associated with the third phase 120-3, a respective input voltage switch circuit 170-3 is activated to an ON state, enabling the phase 110-3 to produce the output voltage 190-3 to power load 118.

Accordingly, in such an instance, due to the failure associated with phase 110-1, the input voltage switch circuitry 170-1 is deactivated to an OFF state such that the first phase 110-1 does not produce an output voltage to power the load 118. The other non-failing phases such as phase 110-2, phase 110-3, etc., continue to produce a respective output voltage to power the load 118 because the respective input voltage switch circuitry is activated to an ON state.

Independently activating each of the phases (using the input voltage switch circuitry) depending upon whether there is a failure in the phases ensures that one or more failing phases do not cause shutdown of the multi-phase power supply 100. Instead, as mentioned, the phases that experience the failure are shut down; the other one or more non-failing phases continue to supply power to respective load 118.

Figure 4:
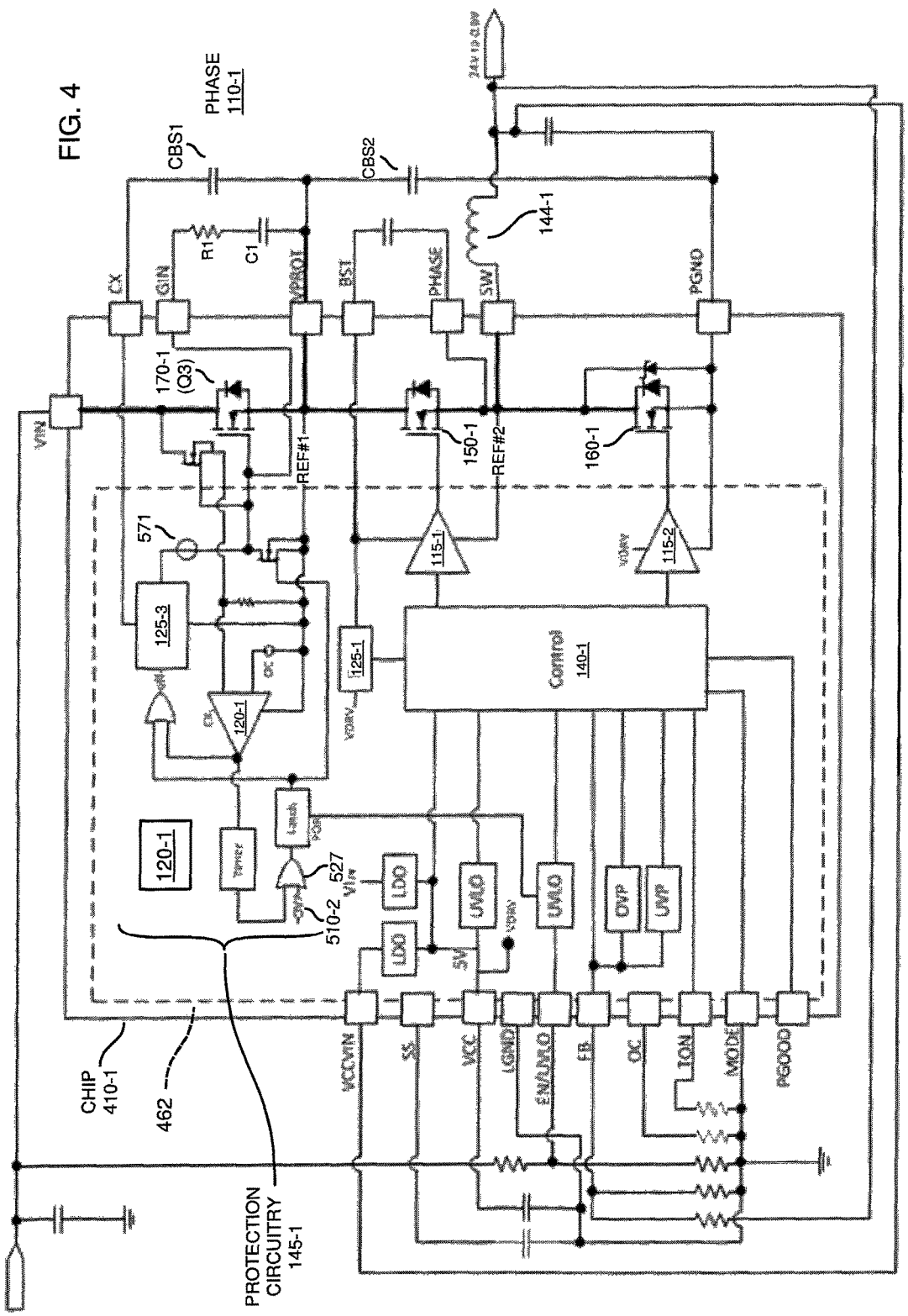
FIG. 4 is an example detailed diagram illustrating a respective power supply phase and corresponding components according to embodiments herein.

FIG. 4 is an example diagram illustrating a power supply phase according to embodiments herein.

In this example, the power supply phase 110-1 includes chip 410-1 (such as a semi-conductor chip, integrated circuit, multi-chip module etc.) on which resides multiple circuit components such as high side switch circuitry 150-1, low side switch circuitry 160-1, input voltage switch circuit 170-1, controller circuitry 140-1, monitor circuitry 120-1, etc.

Each of the phases in the multi-phase power supply 100 can be configured in a similar manner on a respective chip.

As previously discussed, the protection circuitry 145-1 controls conveyance of the input voltage 121 to the high side switch circuitry 150-1 depending on a health of the respective phase 110-1.

Note that the implementation of each of the phases such as phase 110-1, phase 110-2, etc., and corresponding circuitry can vary depending on the embodiment.

For example, phase 110-1 can be packaged as a multi-chip module including 4 dice, namely three FETs (including high side switch circuitry 150-1, low side switch circuitry 160-2, and input voltage switch circuit 170-1) and one die for "driver and control" circuitry such as circuit 462. In such an instance, the high side switch circuitry 150-1 and the low side switch circuitry 160-1 are buck converters to step down the input voltage Vin, while the input voltage switch circuit 170-1 provides protection in a manner as previously discussed.

In one embodiment, the "driver and control" die such as circuit 462 includes a driver circuit (115) for each of the high side switch circuitry 150-1 and low side switch circuitry 160-1 as well as a driver circuit for the input voltage switch circuit 170-1. As previously discussed, the low side switch circuitry 160-1 is referenced to ground; however, both the high side switch circuitry 160-1 and the input voltage switch circuit 170-1 need driver voltage supplied by respective bootstrap capacitors CBS2 and CBS1 since their sources are not connected to ground.

Note that the input voltage switch circuit 170-1 can also be integrated with a driver circuit (including driver 115-1, driver 115-2, etc., as a single integrated circuit to reduce the number of chips in a respective module. This leads to easier IC (Integrated Circuit) design and control of the input voltage switch circuit 170-1, but may increase driver cost due to inclusion of the protection circuitry 145-1 (which includes the input voltage switch circuit 170-1).

Figure 5:
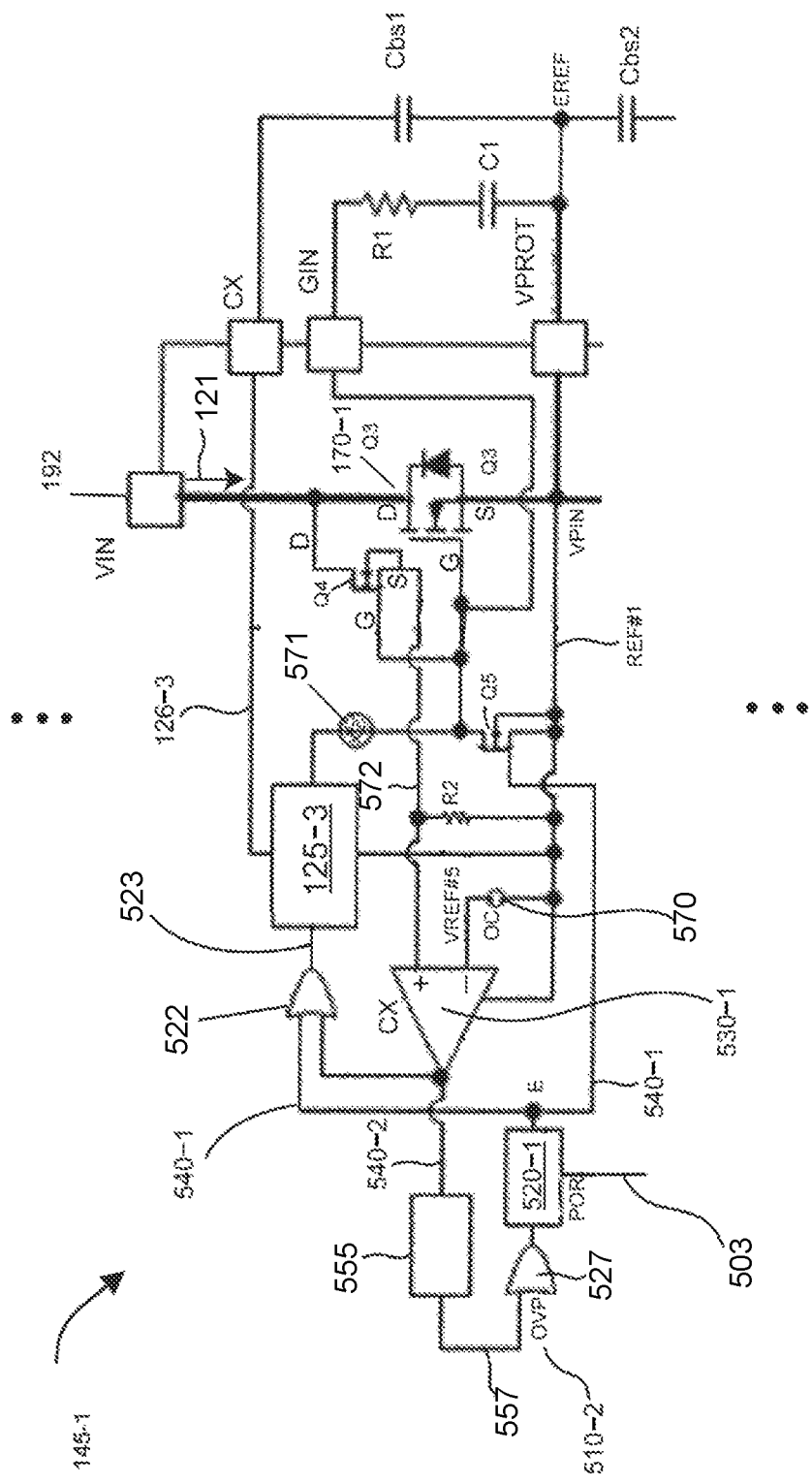
FIG. 5 is an example detailed diagram illustrating input voltage control circuitry according to embodiments herein.

The input voltage switch circuit 170-1 can also be a disparate or separate chip device installed next to an MCM (Multi-Chip Module) package. In such an instance, the control functionality (such as protection circuitry 145-1 associated with input voltage switch circuit as shown in FIG. 5) would remain in the driver and MCM package.

In accordance with yet further embodiments, each of the high side switch circuitry 150-1, low side switch circuitry 160-1, and the input voltage switch circuitry 170-1 can be implemented on a different integrated circuit chip. For example, the high side switch circuitry 150-1 can be disposed on a first integrated circuit (chip); the low side switch circuitry 160-1 can be disposed on a second integrated circuit (chip); the input voltage switch circuit 170-1 can be disposed on a third integrated circuit (chip); etc.

In yet another embodiment, the input voltage switch circuit 170-1 and corresponding driver/control circuitry (protection circuitry 145-1) are disposed on a single integrated circuit (chip).

Accordingly, the different components as discussed herein can be packaged in many different ways.

Note that the input voltage switch circuit 170-1 can be applied to powerstages and POL (Point of Load) devices to provide additional system isolation capabilities.

Specific details of an embodiment of protection circuitry 145-1 and corresponding operation are further shown and discussed in FIG. 5.

FIG. 5 is an example detailed diagram illustrating a respective power supply phase and corresponding components according to embodiments herein.

As shown, the protection circuit 145-1 of phase 110-1 includes input voltage switch circuitry 170-1 (a.k.a., transistor Q3 in FIG. 5), transistor Q4 (such as a field effect transistor), transistor Q5 (such as a field effect transistor), voltage generator circuit 125-3, comparator circuit 530-1, etc.

In one embodiment, on power up of the phase 110-1, generation of the POR [Power ON Reset] signal 503 clears the fault latch 520-1 so that the output signal 540-1 of the fault latch 520-1 indicates that there are no failures associated with respect to phase 110-1. Accordingly, the fault latch 520-1 initially produces the output signal 540-1 to indicate that there is no failure condition.

Note that when the output of the fault latch 520-1 indicates no failure condition, the fault latch 520-1 produces the output signal 540-1 to be a low voltage (or logic low), causing the transistor Q5 to be set to an OFF state. As further discussed below, transistor Q4 and Q3 are set to an ON state when the transistor Q5 is set to an OFF state.

More specifically, input voltage switch circuit 170-1 (transistor Q3) can be a so-called eFuse type of device connected in series between the input voltage 121 (from voltage supply source 192) and VPIN (VPROT or REF#1). VPIN voltage (through pin labeled VPROT is also labeled as EREF (also known as REF #1), which indicates that this node voltage is the "elevated reference" voltage for the entire protection circuitry 145-1.

In one embodiment, transistor Q4 is a current sense MOSFET (Metal Oxide Field Effect Transistor) implemented in FIG. 5 in a "current mirror" manner with respect to transistor Q3. Note that use of a current mirror (transistors Q3 and Q4) is shown by way of non-limiting example embodiment only. As previously discussed, any suitable technique can be used to monitor for a failure condition associated with the phase. For example, as an alternative to a current mirror topology, embodiments herein can include sensing the voltage across the drain and source of the transistor Q3 combined with the respective Rds (ON) state transistor Q3 to determine a monitor current going through the transistor Q3.

Referring again to FIG. 5, by way of non-limiting example embodiment, transistor Q4 is a smaller power MOSFET with Rdson≈30,000 times more than that of Q3 (high side switch circuitry 170-1). Note that the Rdson ratio (such as 30,000) can be any suitable value, and is sometimes referred to as a "Kilis" factor. The Kilis factor for the transistors Q3 and Q4 (such as a MOSFET device) is accurately known. As shown, the gates and drains of Q4 and Q3 are tied together, while source terminal of transistor Q4 is connected to EREF (REF#1) through R2.

Voltage across R2 (signal 572) represents sensed current information and indicates an amount of current flowing through transistor Q3 (input voltage switch circuit 170-1). For example, as current flows through transistor Q3, a ratio metric amount of current flows through transistor Q4 and resistor R2 to node REF #1. The voltage signal 572 on resistor R2 is compared to VREF#5 by the comparator 530-1. VREF #5 is a current threshold value produced by the reference voltage generator 570. If the voltage signal 572 is above a threshold indicating an excess amount of current through the transistor Q3, the comparator 530-1 produces output signal 540-2 to indicate the overcurrent condition.

As further discussed below in more detail, timer 555 adds a "hold-up" time to confirm (deglitch) the "fault" and enable the latch 520-1. In other words, if the overcurrent condition occurs for a sufficient amount of time, then the timer 555 produces output signal 557 indicating the overcurrent condition, causing the latch 520-1 to be set indicating the failure.

More specifically, in response to detecting an overcurrent condition with respect to the transistor Q3 for a sufficient time duration, the latch signal output 540-1 of the latch circuitry 520-1 sends an "OFF" notification to voltage generator circuit 125-3 to slowly turn off the current source 571 during the failure condition when the current through the transistor Q3 is above a threshold value (VREF#5). As further shown, the current source 571 drives and controls the gate node of transistor Q3 (input voltage switch circuit 170-1). Latch signal output 540-1 also drives and controls the gate node of transistor Q5. During a failure condition, when the latch signal output 540-1 is logic high indicating the failure condition, latch signal output 540-1 turns ON transistor Q5, which pulls the gate-source voltage of transistor Q3 (i.e., Vgs_q3) to 0V, thus turning OFF the transistor Q3 (input voltage switch circuitry 170-1) due to the overcurrent condition.

Accordingly, via protection circuitry 145-1, whenever a high-current above a predetermined threshold is detected through transistor Q3 (input voltage switch circuit 170-1) via circuitry 530-1, the input voltage 121 is disconnected from VPIN. In other words, as previously discussed, setting the input voltage switch circuitry 170-1 to the OFF state results in isolating the high side switch circuitry 150-1 of phase 110-1 from receiving the input voltage 121.

Note that if a very short glitch appears at the output signal 540-2 of comparator 530-1, the timer 555 ensures that, as long as the duration of this pulse is lower than a "deglitch time", no fault signal appears at timer output signal 557. In other words, the timer circuitry 555 does not produce the timer output signal 557 to indicate a respective fault condition unless the overcurrent condition occurs for more than a predetermined amount of time.

More specifically, note that the output of comparator 530-1 is ORed (via logic 522) with signal 540-1. Even though a short glitch on the output signal 540-2 will not cause the latch circuitry 520-1 to be set, the logic circuitry 522 also receives the signal 540-2 generated by circuitry 530-1. During detection of an overcurrent condition of short duration, the respective short glitch pulse of signal 540-2 passes through logic 522, thus indicating to the voltage generator circuit 125-3 (such as a charge pump) to start decreasing the current supply through current source 571. Effectively, in such an instance, transistor Q3 (a.k.a., input voltage switch circuitry 170-1) goes into a linear operational mode and restricts respective current flowing through the transistor Q3 (input voltage switch circuitry 170-1). Since in this scenario, transistor Q5 doesn't turn ON because fault latch 520-1 does not indicate a fault yet, the transistor Q3 is not completely turned OFF during the overcurrent condition, as long as the overcurrent condition (glitch) is very short. This gate current limiting on transistor Q3 helps avoid conveying excessive input current through the transistor Q3 to the high side switch circuitry 150-1.

In accordance with yet further embodiments, as previously discussed, if the overcurrent condition lasts for a sufficient amount of time, the failure condition will be latched via respective latch circuit 520-1 such that the failing phase is prevented from being activated to an ON state again until the respective latch circuit 520-1 is reset. In other words, setting the latch circuitry 520-1 to indicate the fault condition causes the signal 540-1 to go to a high state, turning OFF the transistor Q3.

Accordingly, in one embodiment, the protection circuitry 145-1 includes a current detection circuit in order to detect and monitor an amount of current passing through the input voltage switch circuit 170-1. For example, as previously discussed, when the input voltage switch circuit 170-1 is controlled to an ON state, a proportional amount of current passes through transistor Q4 (which is also set to an ON state) through resistor R2 to the voltage reference REF #1. This current through the resistor R2 produces a respective input voltage 572 on the positive input of the comparator circuit 530-1. The negative input of the comparator circuit 530-1 is set to VREF #5 via reference voltage generator 570. The comparator circuitry 530-1 compares the input voltage 572 to the reference voltage VREF #5 to determine whether a fault condition (over-current condition through the input voltage switch circuit 170-1) exists. For example, if the current through transistor Q4 and R2 is above a threshold value indicating that the amount of current through the input voltage switch circuit 170-1 is also above a threshold value, the comparator circuit 530-1 produces the status signal 540-2 to indicate (via a logic high state) occurrence of the over-current condition. The occurrence of the fault condition for a sufficient amount of time (as detected by a timer circuitry 555) causes the latch circuitry 520-1 to be set, resulting in the transistor Q3 being shut OFF. Conversely, as previously discussed, short-term glitches of excessive current through the transistor Q3 causes the current source 571 to reduce the voltage applied to gate node of transistor Q3, reducing amount of current passing through the transistor Q3.

Accordingly, in response to detecting an over-current condition with respect to current flowing through the input voltage switch circuitry 170-1, the protection circuitry 145-1 causes the input voltage switch circuitry 170-1 to act as a current limiter or be set to an OFF state, preventing current or reducing an amount of current flowing from the input voltage 121 to the high side switch circuitry 150-1.

Figure 6:
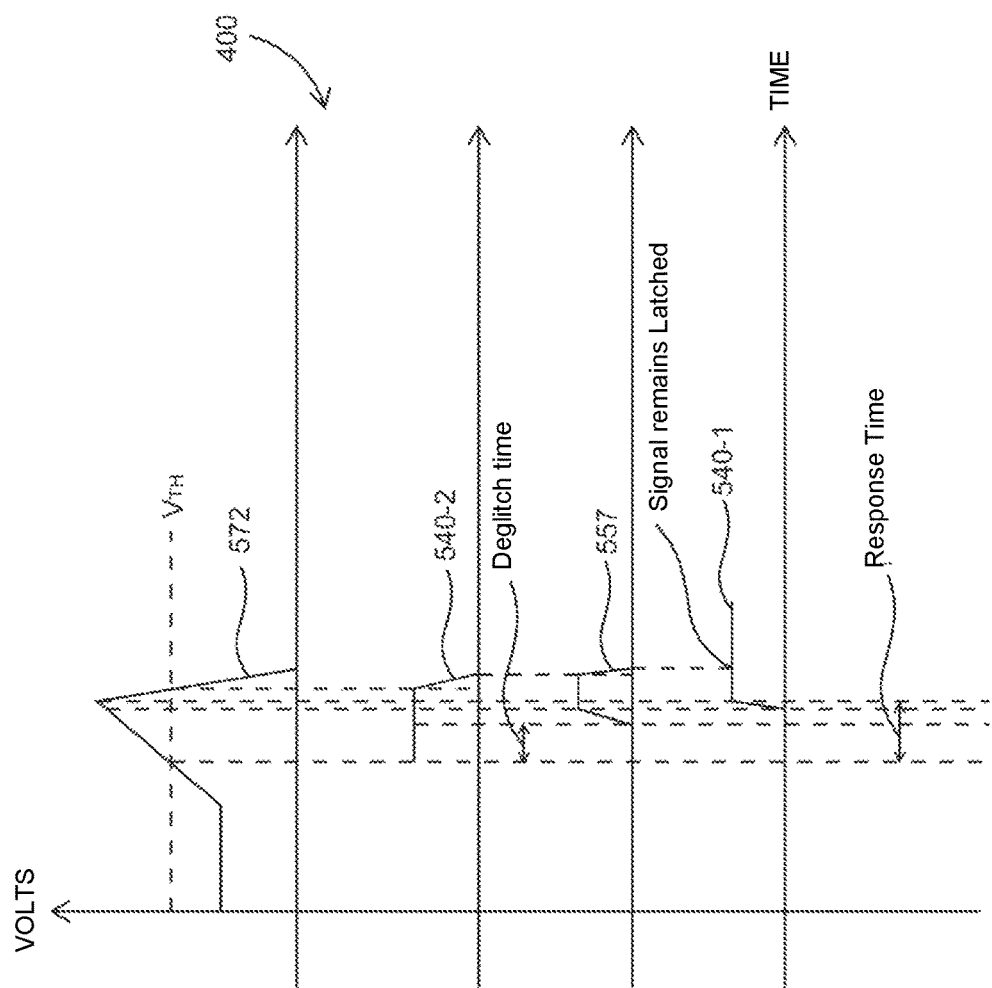
FIG. 6 is an example timing diagram illustrating detection and latching of an error condition and a corresponding control response according to embodiments herein.

FIG. 6 is an example timing diagram illustrating detection and latching of an error condition according to embodiments herein.

As shown in timing diagram 600, detection of the voltage 572 above the threshold value (VREF#5) causes the output signal 540-2 of the comparator 530-1 to be set to a respective high state indicating the overcurrent condition. In response to detecting the output signal 540-2 is in a high state for a sufficient (predetermined) amount of time as shown, the timer circuit 555 generates the timer output signal 557 to indicate the failure condition. As previously discussed, the failure condition as indicated by the high state of the timer output signal 557 causes the latch circuitry 520-1 to be set, resulting in the latch output signal 540-1 to be set to a high state as well indicating the latched error condition. This causes the transistor Q3 (input voltage switch circuitry 170-1) to be set to an OFF state as previously discussed.

Figure 7:
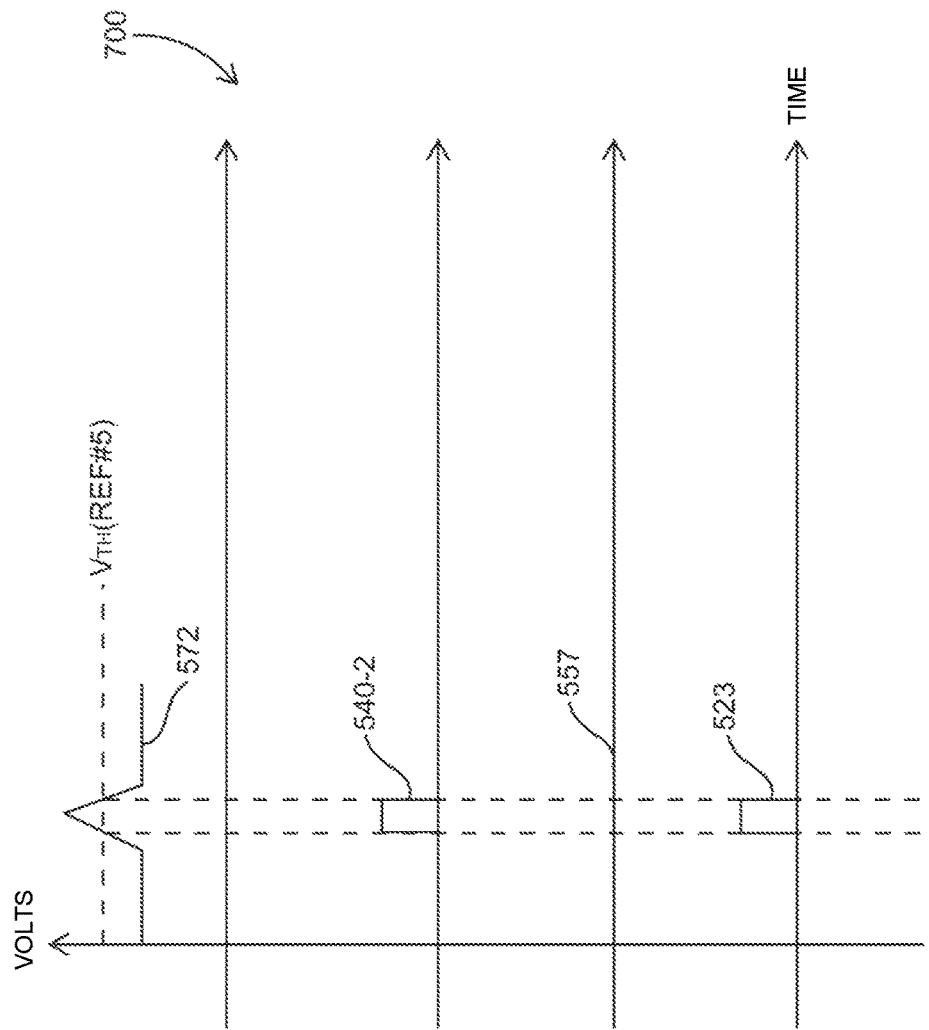
FIG. 7 is an example timing diagram illustrating detection and latching of an error condition and a corresponding control response according to embodiments herein.

FIG. 7 is an example timing diagram illustrating detection of an error condition without latching the error condition according to embodiments herein.

As shown in timing diagram 700, and as previously discussed, detection of the voltage 572 above the threshold value, VTH (VREF#5), causes the output signal 540-2 of the comparator 530-1 to be set to a respective high state indicating the overcurrent condition. In this situation, the over-current condition is a glitch and does not last very long. Because the duration in which the current through the transistor Q3 is so short (that is, the overcurrent condition lasts less than a predetermined amount of time), the timer circuitry 555 does not set the timer output signal 557 to a high state. Because the duration of the failure is less than a predetermined amount of time, and that the output 557 of the timer circuitry 555 does not indicate a fault condition via signal 557, the latch circuit 520-1 is not latched to indicate a respective failure condition. In such an instance, as previously discussed, the transistor Q3 is not set to an OFF state but is controlled in a linear mode so that the amount of current passing through the transistor Q3 is limited or reduced in a manner as previously discussed.

Referring again to FIG. 4, note that the voltage generator circuit 125-3 (such as a charge pump or other suitable circuitry) ensures a sufficiently high magnitude supply voltage available for the protection circuitry 145-1 by charging of the bootstrap capacitor Cbs1. The reference level (REF #1) for both the voltage generator circuit 125-3 as well as Cbs1 is REF #1 (EREF). Since the transistor Q3 is always ON during system operation (as long as no failure condition exists), the input voltage 121 is very close in magnitude to VREF#1 (VPIN). The capacitor Cbs2 ensures that REF#1 (EREF) voltage level is decoupled and stable with respect to PGND. Current source 571 is a driver connected from the voltage generator circuit 125-3 to the gate of transistor Q3, which ensures that transistor Q3 is ON during normal operation.

During operations of activating and deactivating the transistor Q3, note that snubber circuitry (including resistor R1 and capacitor C1) controls a slew rate of the voltage applied to the gate node of transistor Q3 (input voltage switch circuitry 170-1).

Further, as previously discussed, the latch circuitry 520-1 ensures that a respective fault is latched if the failure condition is substantial and lasts a sufficient amount of time. In the absence of including latch circuitry 520-1 in the protection circuitry 145-1, that is, if there were no latch circuitry 520-1, assuming that the output of the comparator circuitry 540-2 were to solely control the voltage generator circuit 125-3, as soon as the transistor Q3 turns OFF from the overcurrent condition and the current through the transistor Q3 subsequently decreases below the over-current threshold, the fault would be cleared and the transistor Q3 would turn ON again. Thus, during overcurrent condition, without the latch circuitry 520-1, the circuit would toggle controlling the transistor Q3 between on and off states. Accordingly, inclusion of the latch circuitry 520-1 in the protection circuitry 145-1 prevents unwanted oscillations of the transistor Q3 turning ON and OFF.

In one embodiment, the OVP signal 510-2 input to the OR gate 527 is based on a value of the output voltage 190 as received from FB pin of the chip 410-1. The FB pin is a voltage divided signal of output voltage 190 (Vout) of the multi-phase power supply 100. Thus, FB pin provides information about Vout. Whenever the over-voltage condition (as indicated by OVP) indicates that the output voltage 190 is above a predetermined output voltage threshold value, the latch circuitry 520-1 is set to indicate the fault condition, turning OFF the transistor Q3 in order to provide protection as discussed herein.

Figure 8:
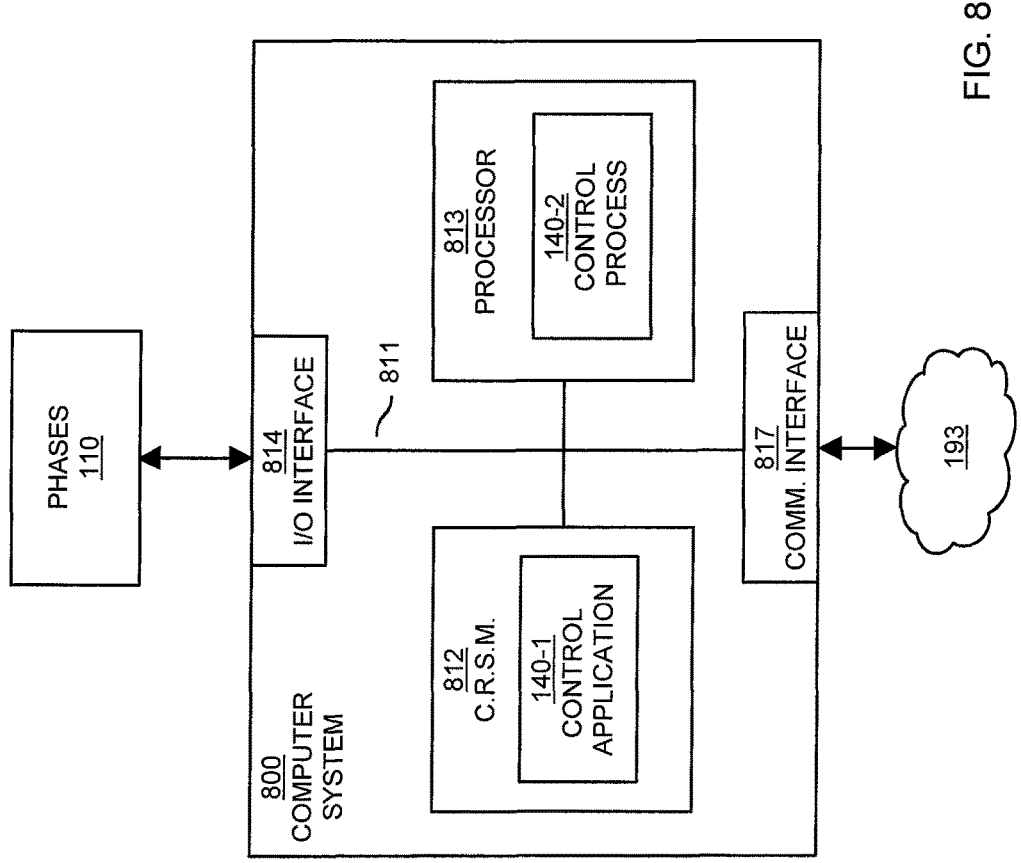
FIG. 8 is an example diagram illustrating computer processor hardware and related software instructions to execute methods according to embodiments herein.

FIG. 8 is an example block diagram of a computer device for implementing any of the operations as discussed herein according to embodiments herein.

As shown, computer system 800 (such as implemented by any resource such as controller circuitry 140 in multi-phase power supply 100) of the present example includes an interconnect 811 that couples computer readable storage media 812 such as a non-transitory type of media (i.e., any type of hardware storage medium) in which digital information can be stored and retrieved, a processor 813 (e.g., computer processor hardware such as one or more processor devices), I/O interface 814, and a communications interface 818.

I/O interface 814 provides connectivity to any suitable circuitry such as each of phases 110.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations as described herein.

Further in this example embodiment, communications interface 818 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 800.

In accordance with different embodiments, note that computer system may be a micro-controller device configured to control a power supply and perform any of the operations as described herein.

Functionality supported by the different resources will now be discussed via flowcharts in FIG. 9. Note that the steps in the flowcharts below can be executed in any suitable order.

Figure 9:
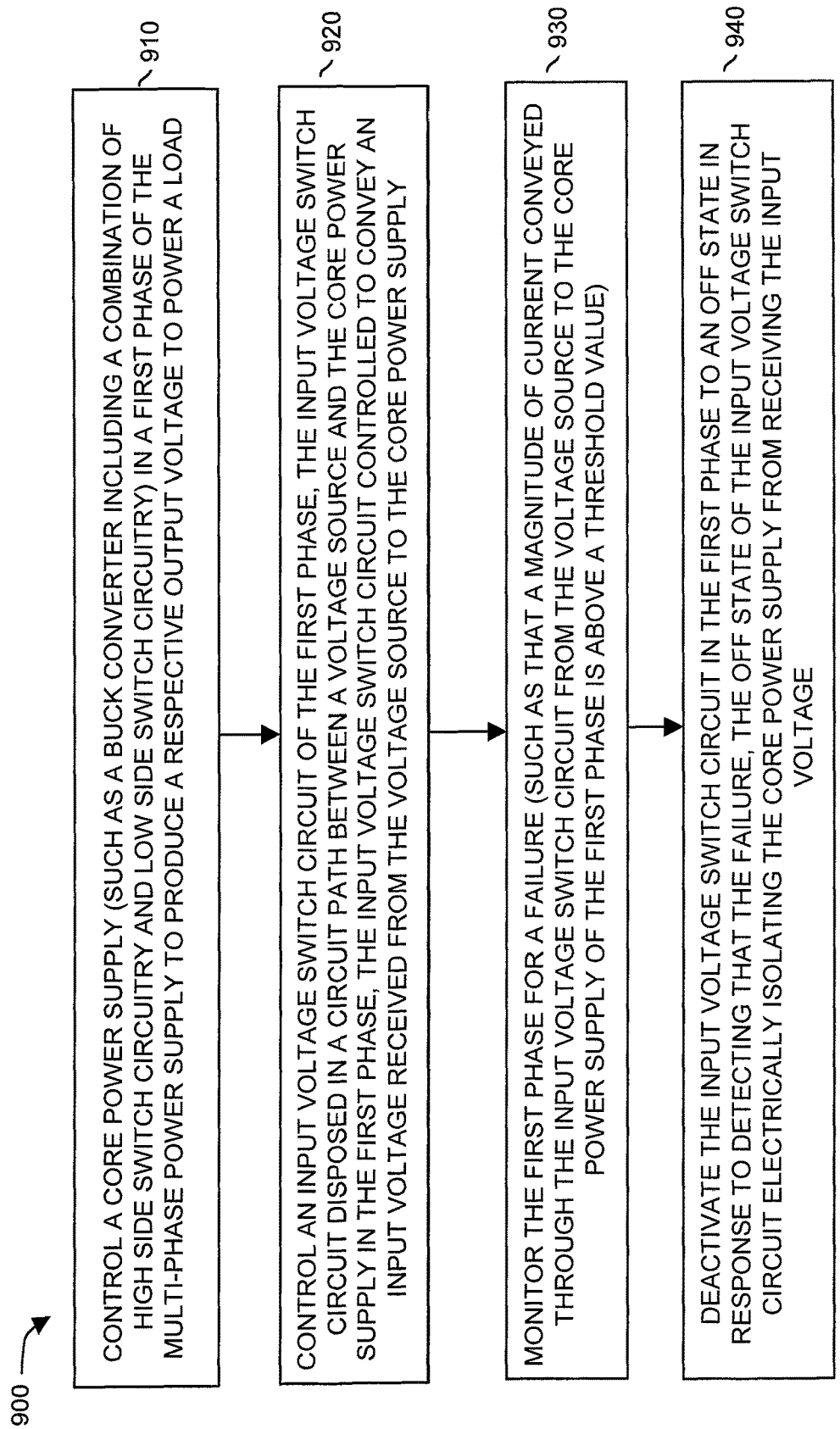
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the controller circuitry 140 controls a core power supply (such as a buck converter including a combination of high side switch circuitry 150-1 and low side switch circuitry 160-1) in a first phase 110-1 of the multi-phase power supply 100 to produce a respective output voltage 190-1 to power a load 118.

In processing operation 920, the controller circuitry 140 controls an input voltage switch circuit 170-1 of the first phase 110-1; the input voltage switch circuit 170-1 disposed in a circuit path between a voltage source 192 and the core power supply in the first phase 110-1; the control circuitry 140-1 controls the input voltage switch circuit 170-1 to convey an input voltage 121 received from the voltage source 192 to the high side switch circuitry 150-1.

In processing operation 930, the monitor circuitry 140 monitors the first phase 110-1 for a failure. In one non-limiting example embodiment, the monitor circuitry 120-1 monitors a magnitude of current conveyed through the input voltage switch circuit 170-1 from the voltage source 121 to the high side switch circuitry 150-1. The monitor circuit 120-1 flags an error if the magnitude of current is above a threshold value.

In processing operation 940, the controller circuitry 140 deactivates the input voltage switch circuit 170-1 in the first phase to an OFF state in response to detecting the failure associated with the first phase 110-1. The OFF state of the input voltage switch circuit 170-1 electrically isolates the core power supply (combination of high side switch circuitry 150-1 and low side switch circuitry 160-1) from receiving the input voltage 121.

Note again that techniques herein are well suited for use in power converter circuit applications such as those that include multiple phases, multiple DC-DC power converter circuits, semi-resonant DC-DC phases, buck converters, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Further Summary and Permutations of Embodiments

Clause 1. A power supply phase comprising:
  high side switch circuitry;
  low side switch circuitry, a combination of the high side switch circuitry and the low side switch circuitry controlled to produce a respective output voltage to power a load; and
  an input voltage switch circuit disposed between a voltage source and the high side switch circuitry, the input voltage switch circuit operable to control conveyance of an input voltage received from the voltage source to the high side switch circuitry.

Clause 2. The power supply phase as in any of clauses 1-10, wherein the input voltage switch circuit is operable to selectively convey the received input voltage from the voltage source to a circuit path connecting the input voltage switch circuit to the high side switch circuitry, the power supply phase further comprising:
a voltage generator circuit whose power input is referenced with respect to a voltage level of the circuit path to produce an internal supply voltage with respect to the voltage level of the circuit path; and
an input voltage control circuit operable to use the internal supply voltage generated by the voltage generator circuit to control the input voltage switch circuit to an ON state.

Clause 3. The power supply phase as in any of clauses 1-10 further comprising:
a first bootstrap voltage generator circuit operable to produce a first bootstrap voltage, the first bootstrap voltage used to control the input voltage switch circuit; and
a second bootstrap voltage generator circuit operable to produce a second bootstrap voltage, the second bootstrap voltage used to control the high side switch circuitry.

Clause 4. The power supply phase as in any of clauses 1-10 further comprising:
a first circuit path coupling the input voltage switch circuit to the high side switch circuitry, a first bootstrap voltage generator circuit of the power supply phase referenced with respect to the first circuit path to produce a first bootstrap voltage used to control the input voltage switch circuit; and
a second circuit path coupling the high side switch circuitry to the low side switch circuitry, a second bootstrap voltage generator circuit of the power supply phase referenced with respect to the second circuit path to produce a second bootstrap voltage used to control the high side switch circuitry.

Clause 5. The power supply phase as in any of clauses 1-10 further comprising:
a monitor circuit operable to monitor a magnitude of current conveyed through the input voltage switch circuit from the voltage source to the high side switch circuitry; and
a control circuit operable to deactivate the input voltage switch circuit to an OFF state in response to detecting that the magnitude of the current is above a threshold value, the OFF state of the input voltage switch circuit electrically isolating the high side switch circuitry from receiving the input voltage.

Clause 6. The power supply phase as in any of clauses 1-10, wherein the power supply phase is a first phase of multiple phases in a multiphase power supply, the input voltage switch circuit operable to control conveyance of the input voltage to only the high side switch circuitry in the first phase.

Clause 7. The power supply phase as in any of clauses 1-10 further comprising:
an input voltage control circuit operable to control the input voltage switch circuit;
a high side switch control circuit operable to control the high side switch circuitry;
a low side switch control circuit operable to control the low side switch circuitry; and
wherein the input voltage control circuit, the high side switch control circuit, and the low side switch control circuit reside on a same semiconductor die.

Clause 8. The power supply phase as in any of clauses 1-10 further comprising:
an input voltage control circuit operable to produce a control signal to activate a control switch that electrically couples a control input of the input voltage switch circuit to a voltage of a circuit path connecting the input voltage switch circuit to the high side switch circuitry, activation of the control switch controlling the input voltage switch circuit to an OFF state to prevent the input voltage from being conveyed to the high side switch circuitry.

Clause 9. A multi-phase power supply including the power supply phase in any of clauses 1-10, wherein the power supply phase is a first phase of the multi-phase power supply, the multi-phase power supply further including a second phase comprising:
second high side switch circuitry;
second low side switch circuitry, a combination of the second high side switch circuitry and the second low side switch circuitry controlled to produce a respective second output voltage to power the load; and
a second input voltage switch circuit disposed between the voltage source and the second high side switch circuitry, the second input voltage control circuit operable to control conveyance of the input voltage received from the voltage source to the second high side switch circuitry.

Clause 10. The power supply phase as in any of clauses 1-10 further comprising:
a monitor circuit operable to monitor a health status of the power supply phase; and
a control circuit operable to deactivate the input voltage switch circuit to an OFF state in response to detecting that the health status indicates a failure of the power supply phase.

Clause 11. A multi-phase power supply comprising:
an input port to receive an input voltage from a voltage source;
a first power supply phase, the first power supply phase including a first input voltage switch circuit disposed between the voltage source and a power supply circuit in the first power supply phase, the first input voltage switch circuit operable to control conveyance of the input voltage received from the voltage source to the power supply of the first power supply phase; and
a second power supply phase, the second power supply phase including a second input voltage switch circuit disposed between the voltage source and a power supply circuit in the second power supply phase, the second input voltage switch circuit operable to control conveyance of the input voltage received from the voltage source to the power supply of the second power supply phase.

Clause 12. The multi-phase power supply as in any of clauses 11-15 further comprising:
a first monitor circuit operable to monitor a magnitude of current conveyed through the first input voltage switch circuit from the voltage source to the first power supply phase;
a first control circuit operable to deactivate the first input voltage switch circuit to an OFF state in response to detecting that the magnitude of the current conveyed through the first input voltage switch circuit is above a first threshold value;

a second monitor circuit operating independently of the first monitor circuit, the second monitor circuit operable to monitor a magnitude of current conveyed through the second input voltage switch circuit from the voltage source to the second power supply phase;

a second control circuit operable to continue activating the second input voltage switch circuit to an ON state in response to detecting that the magnitude of the current conveyed through the second input voltage switch circuit is below a second threshold value.

Clause 12. The multi-phase power supply as in any of clauses 11-15, wherein the first phase includes a first buck converter, the first buck converter operable to produce a first phase output voltage based upon the input voltage received through the first input voltage switch circuit; and wherein the second phase includes a second buck converter, the second buck converter operable to produce a second phase output voltage based upon the input voltage received through the second input voltage switch circuit, the first phase output voltage and the second phase output voltage combined to power a respective load.

Clause 13. The multi-phase power supply as in any of clauses 11-15, wherein the first phase includes: i) a first bootstrap voltage generator circuit operable to produce a first bootstrap voltage, the first bootstrap voltage used to control the first input voltage switch circuit, and ii) a second bootstrap voltage generator circuit operable to produce a second bootstrap voltage, the second bootstrap voltage used to control operation of high side switch circuitry in the first power supply phase; and wherein the second phase includes: i) a third bootstrap voltage generator circuit operable to produce a third bootstrap voltage, the third bootstrap voltage used to control the second input voltage switch circuit, and ii) a fourth bootstrap voltage generator circuit operable to produce a fourth bootstrap voltage, the fourth bootstrap voltage used to control operation of high side switch circuitry in the second power supply phase.

Clause 14. The multi-phase power supply as in any of clauses 11-15, wherein the first phase includes a first control switch and a second control switch, the first control switch operable to deactivate the first input voltage switch circuit in response to detecting a failure condition associated with the first phase, the second control switch operable to continue activating the second input voltage switch circuit to an ON state in response to detecting no failure condition associated with the second phase.

Clause 15. The multi-phase power supply as in any of clauses 11-15 further comprising:
control circuitry operable to independently deactivate the first input voltage switch circuit and the second input voltage switch circuit.

Clause 16. A method of control a multi-phase power supply, the method comprising:
controlling a combination of high side switch circuitry and low side switch circuitry in a first phase of the multi-phase power supply to produce a respective output voltage to power a load; and
controlling an input voltage switch circuit of the first phase of the first phase, the input voltage switch circuit disposed between a voltage source and the high side switch circuitry, the input voltage switch circuit controlled to convey an input voltage received from the voltage source to the high side switch circuitry.

Clause 17. The method as in any of clauses 16-24 further comprising:
selectively conveying the received input voltage from the voltage source to a circuit path connecting the input voltage switch circuit to the high side switch circuitry;
operating a voltage generator circuit whose power input is referenced with respect to a voltage level of the circuit path, the voltage generator circuit producing an internal supply voltage; and
utilizing the internal supply voltage generated by the voltage generator circuit to control the input voltage switch circuit to an ON state.

Clause 18. The method as in any of clauses 16-24 further comprising:
producing a first bootstrap voltage;
utilizing the first bootstrap voltage to control the input voltage switch circuit;
producing a second bootstrap voltage; and
utilizing the second bootstrap voltage to control the high side switch circuitry.

Clause 19. The method as in any of clauses 16-24 clause 16 further comprising:
operating a first voltage generator circuit to produce a first voltage, the first voltage generator circuit of the power supply phase referenced with respect to a voltage level of a first circuit path coupling the input voltage switch circuit to the high side switch circuitry;
using the first voltage generator circuit to control the input voltage switch circuit;
operating a second voltage generator circuit to produce a second voltage, the second voltage generator circuit of the power supply phase referenced with respect to a voltage level of a second circuit path coupling the high side switch circuitry to the low side switch circuitry; and
using the second voltage generator circuit to control the input voltage switch circuit.

Clause 20. The method as in any of clauses 16-24 further comprising:
monitoring a magnitude of current conveyed through the input voltage switch circuit from the voltage source to the high side switch circuitry; and
deactivating the input voltage switch circuit to an OFF state in response to detecting that the magnitude of the current is above a threshold value, the OFF state of the input voltage switch circuit electrically isolating the high side switch circuitry from receiving the input voltage.

Clause 21. The method as in any of clauses 16-24, wherein the multi-phase power supply includes multiple phases including the first phase and a second phase, the input voltage switch circuit controlling conveyance of the input voltage in only the first phase and not the second phase.

Clause 22. The method as in any of clauses 16-24 further comprising:
producing a control signal to activate a control switch that electrically couples a control input of the input voltage switch circuit to a circuit path connecting the input voltage switch circuit to the high side switch circuitry, activation of the control switch controlling the input voltage switch circuit to an OFF state to prevent the input voltage from being conveyed to the high side switch circuitry.

Clause 23. A method as in any of clauses 16-24, wherein the multi-phase power supply includes multiple phases including the first phase and a second phase, the input voltage switch circuit controlling conveyance of the input voltage to the high side switch circuitry in the first phase;
wherein the second phase includes: second high side switch circuitry;
second low side switch circuitry, a combination of the second high side switch circuitry and the second low side switch circuitry controlled to produce a respective second output voltage to power the load; and
a second input voltage switch circuit disposed between the voltage source and the second high side switch circuitry, the method further comprising:
controlling the second input voltage control circuit to control conveyance of the input voltage received from the voltage source to the second high side switch circuitry.

Clause 24. The method as in any of clauses 16-24 further comprising:
monitoring a health status of the power supply phase; and
deactivating the input voltage switch circuit to an OFF state in response to detecting that the health status indicates a failure of the power supply phase.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A power supply phase comprising:
high side switch circuitry;
low side switch circuitry, a combination of the high side switch circuitry and the low side switch circuitry controlled to produce a respective output voltage to power a load; and
an input voltage switch circuit disposed between a voltage source and the high side switch circuitry, the input voltage switch circuit operable to prevent conveyance of an input voltage received from the voltage source to the high side switch circuitry during a fault condition.

2. The power supply phase as in claim 1, wherein the input voltage switch circuit is operable to selectively convey the received input voltage from the voltage source to a circuit path connecting the input voltage switch circuit to the high side switch circuitry, the power supply phase further comprising:
a voltage generator circuit whose power input is referenced with respect to a voltage level of the circuit path to produce an internal supply voltage with respect to the voltage level of the circuit path; and
an input voltage control circuit operable to use the internal supply voltage generated by the voltage generator circuit to control the input voltage switch circuit to an ON state.

3. The power supply phase as in claim 1 further comprising:
a first bootstrap voltage generator circuit operable to produce a first bootstrap voltage, the first bootstrap voltage used by first driver circuitry to control the input voltage switch circuit; and
a second bootstrap voltage generator circuit operable to produce a second bootstrap voltage, the second bootstrap voltage used by second driver circuitry to control the high side switch circuitry.

4. The power supply phase as in claim 1 further comprising:
a first circuit path coupling the input voltage switch circuit to the high side switch circuitry, a first bootstrap voltage generator circuit of the power supply phase referenced with respect to the first circuit path to produce a first bootstrap voltage used to control the input voltage switch circuit; and
a second circuit path coupling the high side switch circuitry to the low side switch circuitry, a second bootstrap voltage generator circuit of the power supply phase referenced with respect to the second circuit path to produce a second bootstrap voltage used to control the high side switch circuitry.

5. The power supply phase as in claim 1 further comprising:
a monitor circuit operable to monitor a magnitude of current conveyed through the input voltage switch circuit from the voltage source to the high side switch circuitry; and
a control circuit operable to deactivate the input voltage switch circuit to an OFF state in response to detecting that the magnitude of the current is above a threshold value, the OFF state of the input voltage switch circuit electrically isolating the high side switch circuitry from receiving the input voltage.

6. The power supply phase as in claim 1, wherein the power supply phase is a first phase of multiple phases in a multiphase power supply, the input voltage switch circuit operable to control conveyance of the input voltage to only the high side switch circuitry in the first phase.

7. The power supply phase as in claim 1 further comprising:
an input voltage control circuit operable to control the input voltage switch circuit;
a high side switch control circuit operable to control the high side switch circuitry;
a low side switch control circuit operable to control the low side switch circuitry; and
wherein the input voltage control circuit, the high side switch control circuit, and the low side switch control circuit reside on a same semiconductor die.

8. The power supply phase as in claim 1 further comprising:
an input voltage control circuit operable to produce a control signal to activate a control switch that electrically couples a control input of the input voltage switch circuit to a voltage of a circuit path connecting the input voltage switch circuit to the high side switch circuitry, activation of the control switch controlling the input voltage switch circuit to an OFF state to prevent the input voltage from being conveyed to the high side switch circuitry.

9. A multi-phase power supply including the power supply phase in claim 1, wherein the power supply phase is a first phase of the multi-phase power supply, the multi-phase power supply further including a second phase comprising:
second high side switch circuitry;
second low side switch circuitry, a combination of the second high side switch circuitry and the second low side switch circuitry controlled to produce a respective second output voltage to power the load; and
a second input voltage switch circuit disposed between the voltage source and the second high side switch circuitry, the second input voltage control circuit operable to prevent conveyance of the input voltage received from the voltage source to the second high side switch circuitry during a failure of the second phase.

10. The power supply phase as in claim 1 further comprising:
a monitor circuit operable to monitor a health status of the power supply phase; and
a control circuit operable to deactivate the input voltage switch circuit to an OFF state in response to detecting that the health status indicates a failure of the power supply phase.

11. A multi-phase power supply comprising:
an input port to receive an input voltage from a voltage source;
a first power supply phase, the first power supply phase including a first input voltage switch circuit disposed between the voltage source and a power supply circuit in the first power supply phase, the first input voltage switch circuit operable to control conveyance of the input voltage received from the voltage source to the power supply circuit of the first power supply phase; and
a second power supply phase, the second power supply phase including a second input voltage switch circuit disposed between the voltage source and a power supply circuit in the second power supply phase, the second input voltage switch circuit operable to control conveyance of the input voltage received from the voltage source to the power supply circuit of the second power supply phase.

12. The multi-phase power supply as in claim 11 further comprising:
a first monitor circuit operable to monitor a magnitude of current conveyed through the first input voltage switch circuit from the voltage source to the first power supply phase;
a first control circuit operable to deactivate the first input voltage switch circuit to an OFF state in response to detecting that the magnitude of the current conveyed through the first input voltage switch circuit is above a first threshold value, the OFF state of the first input voltage switch circuit operable to prevent conveyance of the input voltage to the power supply circuit of the first phase;
a second monitor circuit operating independently of the first monitor circuit, the second monitor circuit operable to monitor a magnitude of current conveyed through the second input voltage switch circuit from the voltage source to the second power supply phase; and
a second control circuit operable to continue activating the second input voltage switch circuit to an ON state in response to detecting that the magnitude of the current conveyed through the second input voltage switch circuit is below a second threshold value, the ON state of the second input voltage switch circuit operable to convey the input voltage to the power supply circuit of the second phase.

13. The multi-phase power supply as in claim 11, wherein the first phase includes a first buck converter, the first buck converter operable to produce a first phase output voltage based upon the input voltage received through the first input voltage switch circuit; and
wherein the second phase includes a second buck converter, the second buck converter operable to produce a second phase output voltage based upon the input voltage received through the second input voltage switch circuit, the first phase output voltage and the second phase output voltage combined to power a respective load.

14. The multi-phase power supply as in claim 11, wherein the first phase includes: i) a first bootstrap voltage generator circuit operable to produce a first bootstrap voltage, the first bootstrap voltage used to control the first input voltage switch circuit, and ii) a second bootstrap voltage generator circuit operable to produce a second bootstrap voltage, the second bootstrap voltage used to control operation of high side switch circuitry in the first power supply phase; and
wherein the second phase includes: i) a third bootstrap voltage generator circuit operable to produce a third bootstrap voltage, the third bootstrap voltage used to control the second input voltage switch circuit, and ii) a fourth bootstrap voltage generator circuit operable to produce a fourth bootstrap voltage, the fourth bootstrap voltage used to control operation of high side switch circuitry in the second power supply phase.

15. The multi-phase power supply as in claim 11, wherein the first phase includes a first control switch and a second control switch, the first control switch operable to deactivate the first input voltage switch circuit to an OFF state in response to detecting a failure condition associated with the first phase, the second control switch operable to continue activating the second input voltage switch circuit to an ON state in response to detecting no failure condition associated with the second phase.

16. The multi-phase power supply as in claim 11 further comprising:
control circuitry operable to independently deactivate the first input voltage switch circuit and the second input voltage switch circuit.

17. A method of control a multi-phase power supply, the method comprising:
controlling a combination of high side switch circuitry and low side switch circuitry in a first phase of the multi-phase power supply to produce a respective output voltage to power a load; and
controlling an input voltage switch circuit of the first phase of the first phase, the input voltage switch circuit disposed between a voltage source and the high side switch circuitry, the input voltage switch circuit controlled to prevent conveyance of an input voltage received from the voltage source to the high side switch circuitry during a fault condition.

18. The method as in claim 17 further comprising:
selectively conveying the received input voltage from the voltage source to a circuit path connecting the input voltage switch circuit to the high side switch circuitry;
operating a voltage generator circuit whose power input is referenced with respect to a voltage level of the circuit path, the voltage generator circuit producing an internal supply voltage; and
utilizing the internal supply voltage generated by the voltage generator circuit to control the input voltage switch circuit to an ON state.

19. The method as in claim 17 further comprising:
producing a first bootstrap voltage;
utilizing the first bootstrap voltage to control the input voltage switch circuit;
producing a second bootstrap voltage; and
utilizing the second bootstrap voltage to control the high side switch circuitry.

20. The method as in claim 17 further comprising:
operating a first voltage generator circuit to produce a first voltage, the first voltage generator circuit of the power supply phase referenced with respect to a voltage level of a first circuit path coupling the input voltage switch circuit to the high side switch circuitry;
using the first voltage generator circuit to control the input voltage switch circuit;
operating a second voltage generator circuit to produce a second voltage, the second voltage generator circuit of the power supply phase referenced with respect to a voltage level of a second circuit path coupling the high side switch circuitry to the low side switch circuitry; and
using the second voltage generator circuit to control the input voltage switch circuit.

21. The method as in claim 17 further comprising:
monitoring a magnitude of current conveyed through the input voltage switch circuit from the voltage source to the high side switch circuitry; and
deactivating the input voltage switch circuit to an OFF state in response to detecting that the magnitude of the current is above a threshold value, the OFF state of the input voltage switch circuit electrically isolating the high side switch circuitry from receiving the input voltage.

22. The method as in claim 17, wherein the multi-phase power supply includes multiple phases including the first phase and a second phase, the input voltage switch circuit controlling conveyance of the input voltage in only the first phase and not the second phase.

23. The method as in claim 17 further comprising:
producing a control signal to activate a control switch that electrically couples a control input of the input voltage switch circuit to a circuit path connecting the input voltage switch circuit to the high side switch circuitry, activation of the control switch controlling the input voltage switch circuit to an OFF state to prevent the input voltage from being conveyed to the high side switch circuitry.

24. A method as in claim 17, wherein the multi-phase power supply includes multiple phases including the first phase and a second phase, the input voltage switch circuit controlling conveyance of the input voltage to the high side switch circuitry in the first phase;
wherein the second phase includes: second high side switch circuitry;
second low side switch circuitry, a combination of the second high side switch circuitry and the second low side switch circuitry controlled to produce a respective second output voltage to power the load; and
a second input voltage switch circuit disposed between the voltage source and the second high side switch circuitry, the method further comprising:
controlling the second input voltage control circuit to control conveyance of the input voltage received from the voltage source to the second high side switch circuitry.

25. The method as in claim 17 further comprising:
monitoring a health status of the power supply phase; and
deactivating the input voltage switch circuit to an OFF state in response to detecting that the health status indicates a failure of the power supply phase.

26. The power supply phase as in claim 1, wherein the high side switch circuitry, low side switch circuitry, and the input voltage switch circuitry are disposed on a single integrated circuit chip.

27. The power supply phase as in claim 1, wherein each of the high side switch circuitry, low side switch circuitry, and the input voltage switch circuitry is disposed on a different integrated circuit chip.

28. The power supply phase as in claim 1 further comprising:
control circuitry to control states of the high side switch circuitry, low side switch circuitry, and the input voltage switch circuit;
drive circuitry to drive the high side switch circuitry, low side switch circuitry, and the input voltage switch circuit as indicated by the control circuitry; and
wherein the control circuitry, drive circuitry, high side switch circuitry, low side switch circuitry, and the input voltage switch circuit are disposed in a multi-chip module.

29. The power supply phase as in claim 1, wherein the input voltage switch circuit is further operable to convey the input voltage received from the voltage source to the high side switch circuitry absent the fault condition.

30. The power supply phase as in claim 1 further comprising:
a monitor operable to monitor a magnitude of current conveyed through the input voltage switch circuit from the voltage source to the high side switch circuitry; and
a controller operable to activate the input voltage switch circuit to an ON state in response to detecting that the magnitude of the current is below a threshold value, the ON state of the input voltage switch circuit conveying the input voltage to the high side switch circuitry.

31. The power supply phase as in claim 30, wherein the controller is operable to repeatedly switch the high side switch circuitry between ON and OFF states to generate the output voltage while the input voltage switch circuit conveys the input voltage to the high side switch circuitry during non-fault conditions.

32. The power supply phase as in claim 1 further comprising:
a controller operable to, during non-fault conditions, continuously activate the input voltage switch circuit to convey the input voltage to the high side switch circuitry while the high side switch circuitry is switched between ON and OFF states to generate the output voltage.

33. The power supply phase as in claim 1, wherein the high side switch circuitry is operable to convey the input voltage to an inductor that produces the output voltage that powers the load; and
wherein the low side switch circuitry is operable to couple the inductor to a reference voltage to produce the output voltage that powers the load.

34. The power supply phase as in claim 1, wherein the high side switch circuitry and the low side switch are part of a DC-DC (Direct Current-Direct Current) converter.

35. The power supply phase as in claim 1, wherein the output voltage is a DC voltage produced by the high side switch circuitry and low side switch circuitry.

36. The power supply phase as in claim 1, wherein the fault condition occurs in response to detecting that current through the input voltage switch circuit is above a threshold value.

* * * * *